US00RE39844E

(19) United States
(12) Reissued Patent
Srnka

(10) Patent Number: US RE39,844 E
(45) Date of Reissued Patent: Sep. 18, 2007

(54) REMOTE RESERVOIR RESISTIVITY MAPPING

(75) Inventor: Leonard J. Srnka, Bellaire, TX (US)

(73) Assignee: Exxonmobil Upstream Research Company, Houston, TX (US)

(21) Appl. No.: 10/798,248

(22) Filed: Mar. 11, 2004

Related U.S. Patent Documents

Reissue of:
(64) Patent No.: 6,603,313
Issued: Aug. 5, 2003
Appl. No.: 09/656,191
Filed: Sep. 6, 2000

U.S. Applications:
(60) Provisional application No. 60/154,114, filed on Sep. 15, 1999.

(51) Int. Cl.
*G01V 3/02* (2006.01)
*G01V 3/08* (2006.01)
*G06F 19/00* (2006.01)

(52) U.S. Cl. ..... 324/354; 324/359; 702/5
(58) Field of Classification Search ..... 324/354, 324/359; 702/5
See application file for complete search history.

(56) References Cited

U.S. PATENT DOCUMENTS

| | | | | |
|---|---|---|---|---|
| 3,727,231 | A | 4/1973 | Galloway et al. | 343/813 |
| 4,247,821 | A | 1/1981 | Buselli et al. | 324/336 |
| 4,446,434 | A | 5/1984 | Sternberg et al. | 324/363 |

(Continued)

FOREIGN PATENT DOCUMENTS

| | | |
|---|---|---|
| RU | 2084929 | 7/1997 |
| WO | WO 98/28638 | 7/1998 |

OTHER PUBLICATIONS

Alumbaugh, D. L. et al, "Three–Dimensional Massively Parallel Electromagnetic Inversion—II. Analysis Of A Crosswell Electromagnetic Experiment", Geophys. J. Inc., v. 128, pp. 355–363, 1997.

Alumbaugh, D. L. et al, "3D EM Imaging From A Single Borehole; A Numerical Feasibility Study", SEG Annual Meeting Expanded Abstracts, v. 1, pp. 448–451, 1998.

Alumbaugh, D. L. et al, "Electromagnetics 3: Inversion Techniques", SEG Annual Mtg. Expanded Abstracts, v. 1, pp. 456–459, 1998.

(Continued)

*Primary Examiner*—Bot LeDynh
(74) *Attorney, Agent, or Firm*—Law Department

(57) ABSTRACT

A method for surface estimation of reservoir properties, wherein location of and average earth resistivities above, below, and horizontally adjacent to the subsurface geologic formation are first determined using geological and geophysical data in the vicinity of the subsurface geologic formation. Then dimensions and probing frequency for an electromagnetic source are determined to substantially maximize transmitted vertical and horizontal electric currents at the subsurface geologic formation, using the location and the average earth resistivities. Next, the electromagnetic source is activated at or near surface, approximately centered above the subsurface geologic formation and a plurality of components of electromagnetic response is measured with a receiver array. Geometrical and electrical parameter constraints are determined, using the geological and geophysical data. Finally, the electromagnetic response is processed using the geometrical and electrical parameter constraints to produce inverted vertical and horizontal resistivity depth images. Optionally, the inverted resistivity depth images may be combined with the geological and geophysical data to estimate the reservoir fluid and shaliness properties.

67 Claims, 9 Drawing Sheets

U.S. PATENT DOCUMENTS

| | | | | | |
|---|---|---|---|---|---|
| 4,535,293 | A | | 8/1985 | Rocroi et al. | 324/336 |
| 4,617,518 | A | | 10/1986 | Srnka | 324/365 |
| 4,633,182 | A | | 12/1986 | Dzwinel | 324/335 |
| 4,751,688 | A | * | 6/1988 | Paulsson | 367/36 |
| 4,875,015 | A | | 10/1989 | Ward | 324/323 |
| 5,142,472 | A | * | 8/1992 | Day | 702/7 |
| 5,486,764 | A | * | 1/1996 | Thompson et al. | 324/323 |
| 5,563,513 | A | | 10/1996 | Tasci et al. | 324/359 |
| 5,666,050 | A | * | 9/1997 | Bouldin et al. | 324/207.26 |
| 6,628,119 | B1 | | 9/2003 | Eidesmo et al. | 324/337 |

OTHER PUBLICATIONS

Buselli, G. et al, "Robust Statistical Methods For Reducing Sferics Noise Contaminating Transient Electromagnetic Measurements", Geophysics, v. 61, pp. 1633–1646, 1996.

Caldwell, T. G. et al, "The Instantaneous Apparent Resistivity Tensor: A Visualization Scheme For LOTEM Electric Field Measurements", Geophys. J. Int., v. 135, pp. 817–834, 1998.

Chave, A. D., Flosadottir, A. H. and Cox, C. S., "Some Comments on Seabed Propagation of ULF/ELF Electromagnetic Fields", 1990, *Radio Science,* vol. 25, No. 5, pp. 825–836.

Cheesman, S. J., Edwards, R. N. and Chave, A. D., "On the Theory of Sea–Floor Conductivity Mapping Using Transient Electromagnetic Systems", Feb. 1987, *Geophysics,* vol. 52, No. 2, pp. 204–217.

Constable, S. and Cox, C.S., "Marine Controlled–Source Electromagnetic Sounding 2. The PEGASUS Experiment", Mar. 1996, *Journal of Geophysical Research,* vol. 101, No. B3, pp. 5519–5530.

Dey, A. et al, "Electric Field Response Of Two–Dimensional Inhomogeneities To Unipolar And Bipolar Electrode Configurations", Geophysics, v. 40, pp. 630–640, 1975.

Edwards, R. N., "On the Resource Evaluation of Marine Gas Hydrate Deposits Using Sea–Floor Transient Electric Dipole–Dipole Methods", 1997, *Geophysics,* vol. 62, No. 1, pp. 63–74.

Egbert, G. D., "Robust Multiple–Station Magnetotelluric Data Processing", Geophys. J. Int., v. 130, pp. 475–496, 1997.

Eswarappa et al. "Mixed Boundary Semicircular and 120 Degrees—Sectoral Microstrip Antennas", IEEE Antennas & Prop. Soc. Int. Symp., Jun. 1989, pp. 1688–1690. (Abstract only).

Flosadottir, A. H. and Constable, S., "Marine Controlled–Source Electromagnetic Sounding Modeling and Experimental Design", Mar. 1996, *Journal of Geophysical Research,* vol. 101, No. B3, pp. 5507–5517.

Garg, N. R. and Keller, G. V., "Synthetic Electric Sounding Surveys Over Known Oil Fields", Nov. 1984, *Geophysics,* vol. 49, No. 11, pp. 1959–1967.

Greaves, R.J., Beydoun, W.B., and Spies, B.R.; "New Dimensions in Geophysics for Reservoir Monitoring", SPE Formation Evaluation, Jun. 1991, pp. 141–150.

Gupta, R. N. et al, "Unipole Method Of Electrical Profiling", Geophysics, v. 28, pp. 608–616, 1963.

Hoversten, G. M. and Nichols, E., "Seaborn Electromagnetic Sub–Salt Exploration", 1992, Abstracts, *American Geophysical Union,* p. 313. (Abstract only).

Hoversten, G. M. et al, "Marine Magnetotellurics For Petroleum Exploration, Part II: Numerical Analysis Of Subsalt Resolution", Geophysics, v. 63, pp. 826–840, 1998.

Hoversten, G. M. et al, "Electromagnetics 2: Modeling For Petroleum and Mining Applications", SEG Annual Meeting Expanded Abstracts, v. 1, pp. 425–428, 1998.

Jupp, D. et al, "Resolving Anisotrophy In Layered Media By Joint Inversion", Geophys. Prospecting, v. 25, pp. 460–470, 1977.

Kaufman, A. A., Goldman, M., Lee, D. S. and Keller, G. V., "Marine Electromagnetic Prospecting System", Apr. 1982, *Geophysics,* vol. 47, p. 431.

Kaufman, A. A. and Keller, G. V., *Frequency and Transient Soundings,* 1983, pub. Elsevier, pp. 285–315.

Leland, R. P., "Estimation Boundary Value Processes Applied to Shape Determination of a Circular Antenna from Observations on the Boundary", IEEE Proc. 30th Cond. Decision & Control, Sections 4–5, Dec. 1991. (Abstract only).

Maurer, H. et al, "Optimized And Robust Experimental Design: A Non–Linear Application To EM Sounding", Geophysics J. Inc., v. 132, pp. 458–468, 1998.

MacGregor, L. M., Constable, S. and Sinha, M. C., "The RAMESSES Experiment—III. Controlled–Source Electromagnetic Sounding of the Reykjanes Ridge at 57°45'N", Jun. 1998, *Geophysics J. Inc.,* vol. 135, pp. 773–789.

Mogilatov, V. S. et al, "A New Method of Geoelectrical Prospecting By Vertical Electric Current Soundings", J. Appl. Geophys., v. 36, pp. 31–41, 1996.

Nekut, A. G. et al, "Petroleum Exploration Using Controlled–Source Electromagnetic Methods", Proceedings IEEE, v. 77, pp. 338–362, 1989.

Newman, G. A. et al, "Three–Dimensional Massively Parallel Electromagnetic Inversion—I. Theory", Report SAND96–0582, Sandia Nat'l Labs, 1996 and Geophys, J. Int., v. 128, pp. 345–354, 1997.

Peters, L. J. and Bardeen, John, "Some Aspects of Electrical Prospecting Applied in Locating Oil Structures", 1932, *Early Geophysical Papers of the Society of Ecploration Geophysicists*—vol. II, pp. 145–164.

Sinha, M. C., Navin, D. A., MacGregor, L. M., Constable, S., Pierce, C., White, A., Heinson, G. and Inglis M. A., "Evidence for Accumulated Melt Beneath the Slow–Spreading Mid–Atlantic Ridge", 1997, *Phil. Trans. R. Soc. Long.,* vol. 355, pp. 233–253.

Spies, B. R., "Depth of Investigation In Electromagnetic Sounding Methods", Geophysics v. 54, pp. 872–888, 1989.

Tarkhov, A. G., "On Electric Geophysical Exploration Methods Of A Pure Anomaly", Bull. Acad. Sci. U.S.S.R., Geophys. Ser., No. 8, 11, 1957.

Verma, S. K. et al, "Focused Resolution Of Thin Conducting Layers By Various Dipole EM Systems", Geophysics, v. 60, pp. 381–389, 1995.

Zhdanov, M. et al, "Resistivity Imaging By Time Domain Electromagnetic Migration (TDEMM)", Exploration Geophysics, v. 26, pp. 186–194, 1995.

Zhdanov, M. et al, "Three–Dimensional Quasi–Linear Electromagnetic Inversion", Radio Science, v. 31, pp. 741–754, 1996.

Zhdanov, M. et al, "Time–Domain Electromagnetic Migration In The Solution Of Inverse Problems", Geophys. J. Int., v. 131, pp. 293–309, 1997.

Zhdanov, M. et al, "Preconditioned Time Domain Electromagnetic Migration", SEG Annual Meeting Expanded Abstracts, v. 1, pp. 461–468, 1998.

* cited by examiner

REMOTE RESERVOIR RESISTIVITY MAPPING

Matter enclosed in heavy brackets [ ] appears in the original patent but forms no part of this reissue specification; matter printed in italics indicates the additions made by reissue.

This application *is a reissue of U.S. application Ser. No. 09/656,191 filed on Sep. 9, 2000 which issued as U.S. Pat. No. 6,603,313 and* claims the benefit of U.S. provisional application No. 60/154,114 filed on Sep. 15, 1999. *Notice: More than one reissue application has been filed for the reissue of U.S. Pat. No. 6,603,313. The reissue applications are U.S. application Ser. Nos. 10/798,248 filed on Mar. 11, 2004 (the present application) and 11/432,510 filed May 11, 2006, both of which are divisional reissues of U.S. Pat. No. 6,603,313.*

FIELD OF THE INVENTION

This invention relates generally to the field of geophysical prospecting. More particularly, the invention relates to surface measurement of subsurface geologic formation electrical resistivity. Specifically, the invention is a method of combining seismic and electromagnetic data to prospect for subsurface formations that contain hydrocarbons.

BACKGROUND OF THE INVENTION

Remote mapping and analysis from the surface of the earth of hydrocarbons reservoired at depth remains a difficult technical task. This is so despite recent advances in 3D seismic imaging, seismic direct hydrocarbon indicator (DHI) and amplitude variation with offset (AVO) analyses, and seismic attribute mapping and interpretation. Seismic detection difficulties arise in part from the fact that the mechanical properties of reservoirs, to which the seismic probe responds, are often only slightly modified when hydrocarbons replace formation waters, especially in the case of oil. The modification may be of the order of only 10's of percent. Subtle mechanical effects related to seismic wave propagation and reflection can mask DHI and AVO signatures or even produce misleading signatures. For example, low gas saturation in water sands can produce false seismic DHIs. Because of such effects, drill-well success rates are too low and exploration costs are too high in many basins. In addition, rapid and low-cost assessment of discovered undeveloped hydrocarbon reserves requires good knowledge of reservoir properties at large distances from the discovery well. Acquiring this knowledge is problematic using only seismic data. There is an urgent need to remotely measure and map other reservoir formation properties that are sensitive to hydrocarbons, and to combine interpretation of these other properties with interpretations of seismic data and their mapped attributes. One particularly important formation property is electrical resistivity, which is strongly related to the pore fluid type and saturation.

The bulk electrical resistivity of reservoirs is often increased substantially when hydrocarbons are present. The increase can be of the order of 100's to 1000's of percent. However, increased formation resistivity alone may not uniquely indicate hydrocarbons. For instance, carbonates, volcanics, and coals can also be highly resistive. Nevertheless, spatial correlation of high formation resistivity with potential traps imaged by seismic data, or with seismic DHI or AVO effects at reservoir depth, provides strong evidence of the presence of oil or gas and valuable information on their concentrations. For example, a low gas saturation high-porosity sandstone reservoir encased in shale can produce a strong seismic DHI and an AVO curve indicative of gas. However, it would also have low electrical resistivity and hence would be a high-risk drill-well prospect.

Most hydrocarbon reservoirs are inter-bedded with shale stringers or other non-permeable intervals and hence are electrically anisotropic at the macroscopic scale. Thus, it is important to measure both the vertical (transverse) and horizontal (longitudinal) electrical resistivities of the reservoir interval. Remote measurement of the vertical and horizontal resistivities of the reservoir interval, combined with estimation of the resistivity of the non-permeable bedding, would provide quantitative bounds on the reservoir's fluid content, such as the hydrocarbon pore volume. However, there is no existing technology for remotely measuring reservoir formation resistivity from the land surface or the seafloor at the vertical resolution required in hydrocarbon exploration and production. Based on the thicknesses of known reservoirs and predicted future needs, this required resolution would be equal to or less than two percent of depth from the earth's surface or seafloor. For example, this would resolve a 200-ft net reservoir thickness (vertical sum of hydrocarbon bearing rock thicknesses within the reservoir interval) or less at a typical 10,000-ft reservoir depth.

Overviews of electromagnetic imaging technology are given by M. N. Nabighian (ed.), Electromagnetic Methods in Applied Geophysics, Vols. 1 & 2, SEG Investigations in Geophysics No. 3, 1988; A. G. Nekut and B. R. Spies, Proceedings IEEE, v. 77, 338-362, 1989; and by M. S. Zhdanov and G. V. Keller, The Geoelectrical Methods in Geophysical Exploration, Elsevier, 1994. Imaging of electrically conductive objects such as ore bodies has been the dominant application for electromagnetic methods. In applications for hydrocarbon exploration, most of the technology was developed to image large geological structures in regions where seismic data are low in quality or are absent, and little other geological or geophysical information is available.

Direct exploration for hydrocarbons using surface-based electromagnetic imaging has been attempted since the 1930s, but with little commercial success. This lack of success is due to the low spatial resolution and the ambiguous interpretation results of current electromagnetic methods, when applied in stand-alone and spatially undersampled ways to the geological imaging problem. Low subsurface resolution is one consequence of the diffusive nature of the low frequency electromagnetic waves, that is, below 1 kHz, required to penetrate the earth to reservoir depths. The vertical resolution of such electromagnetic waves is relatively insensitive to bandwidth, unlike the seismic case, but is very sensitive to the accuracy and precision of phase and amplitude measurements and to the inclusion of constraints from other data. That is, the unconstrained geophysical electromagnetic data inverse problem is mathematically ill posed, with many possible geologic structures fitting electromagnetic data equally well. Consequently, the vertical resolution of unconstrained electromagnetic imaging is typically no better than 10 percent of depth. This gives a resolution of only a 1000-ft net reservoir thickness at a typical 10,000-ft reservoir depth. However, within a given resolved layer, conventional resistivity measurement accuracy can be within a factor of two, which is adequate for oil and gas exploration.

Electromagnetic technology that is applicable to direct reservoir imaging uses electrically grounded controlled sources to produce vertical and horizontal current flow in the subsurface at the reservoir depth. The five embodiments of this technology, well known within the electromagnetic imaging community, are: (1) the LOTEM method described by K. M. Strack, Exploration with Deep Transient Electromagnetics, Elsevier, 1992; (2) the SIROTEM method, described by Buselli in U.S. Pat. No. 4,247,821; (3) CGG's TRANSIEL® system, described in U.S. Pat. No. 4,535,5293; (4) the EMI method, described by Tasci et al. in U.S. Pat. No. 5,563,513; and (5) the WEGA-D method described by B. W. Smith and J. Dzwinel in WEGA-D SYSTEM®, WEGA-D Geophysical Research Ltd., 1984. A newer version of WEGA-D named PowerProbe® has been developed by the Canadian company Enertec, a successor to WEGA-D Geophysical Research. All five methods suffer from the vertical resolution limitation of approximately 10% of depth cited above, which makes them unsuitable for direct reservoir imaging except for unusually thick reservoirs. This resolution limitation results from one or more of the following deficiencies in each method: (1) lack of means to focus the electromagnetic input energy at the target reservoir; (2) spatial undersampling of the surface electromagnetic response fields; (3) measurement of only a few components (usually one) of the multi-component electromagnetic surface fields that comprise full tensor electromagnetic responses at each receiver (except for WEGA-D/PowerProbe); (4) data processing using 1-D, 2-D, or pattern recognition algorithms rather than full 3-D imaging methods; and (5) lack or paucity of explicit depth information and resistivity parameter values incorporated into the data processing to constrain the inversion results.

Another serious limitation in these five methods is their use of high-impedance contact electrodes and connecting wires, with greater than 1 Ohm total series resistance, to transmit the source current into the subsurface. This output impedance is primarily a result of the small surface area of the electrodes that contact (i.e. ground to) the earth. High output impedance severely limits the electrical current at the reservoir depth, which in turn reduces the strengths of the surface electromagnetic responses to the subsurface reservoir for a given source power. Current lmitatin due to high-impedance sources also results in reduced depths of exploration, especially in electrically conductive sedimentary basins. The effective depth of electromagnetic exploration increases as a fractional power of source strength, between $M^{1/5}$ and $M^{1/3}$ for grounded electric dipole sources where M is the dipole moment, that is, current multiplied by dipole length. The exponent depends upon which surface field component is measured, but in general short-offset (or "near-field") electromagnetic receiver responses have the best sensitivity to deep targets, as shown in B. R. Spies, Geophysics v. 54, 872-888, 1989.

V.S. Mogilatov and B. Balashov,J. Appl. Geophys., v. 36, 31-41, 1996; and Mogilatov's Russian patent 2,084,929-C1 describe the use of surface electric concentric ring dipoles and radial electric bipoles. A. G. Tarkov, Bull. Acad. Sci. U.S.S.R., Geophys. Ser., no. 8, 11, 1957, R. N. Gupta and P. K. Bhattacharya, Geophysics, v. 28, 608-616, 1963, and by A. Dey et al., Geophysics, v. 40, 630-640, 1975 describe the use of opposite-polarity collinear surface electric bipoles ("unipoles"). However, ring electrodes described by Mogilatov and Balashov do not contain discussions of, much less calculations for, the optimum electrode dimensions needed to maximize the vertical electric field or current density at the target (reservoir) depth. The unipole methods described by Tarkov, Gupta, Bhattacharya, and Dey et al. do not include discussions of or calculations for the effects of changing the source frequency, or the effects of using finite-length unipoles (second electrodes not at infinite distance), on the optimum configuration needed to maximize the vertical electric field or current density at the target depth.

S. K. Verma and S. P. Sharma, Geophysics, v. 60, 381-389, 1995 and H. Maurer and D. E. Boerner, Geophys. J. Int., v. 132, 458-468, 1998 discuss optimization of surface electromagnetic source array configurations in order to best focus energy onto subsurface targets. However, Verma and Sharma restrict their discussion to subsurface conducting layers, and do not include unipole or concentric ring dipole arrays in their calculations. Maurer and Boerner discuss the more general problem of optimization of surface electromagnetic surveys for imaging subsurface targets, but do not discuss unipole, multiple radial bipole, or concentric ring dipole sources.

Conventional geophysical electromagnetic data processing finds the minimum earth structure, that is, the simplest resistivity model, which is consistent with the measured data within the experimental error bounds, but without explicit incorporation of a priori information. Incorporation of hard constants into the data processing significantly improves spatial resolution and resistivity accuracy, which are not simply related to signal wavelength or bandwidth as in the seismic case. Examination of well log and other data shows that, in most cases, major seismic boundaries are also major resistivity boundaries. In addition, interpretation of seismic, gravity, and magnetic data would provide good knowledge of the major lithologies present in a prospective area before drilling. Applying constraints for a large number, (10's to 100's) of layers and other major geologic boundaries (for instance, faults) would be novel for electromagnetic imaging of hydrocarbon reservoirs.

Two previous method have described the incorporation of seismic constraints to improve spatial resolution in low-frequency electromagnetic geophysical inversion. Although not applied to hydrocarbon reservoir imaging, a method was developed by G. M. Hoversten et. al., Geophysics, v. 63, 826-840, 1998a; and SEG Annual Meeting Expanded Abstracts, v. 1, 425-428, 1998b to improve 2-D natural-source electromagnetic (magnetotelluric) imaging of the base of salt structures in the offshore Gulf of Mexico. Vertical resolution of the salt base improves by a factor of 2 to 3 when the depth to the top of salt is constrained by 3-D seismic data and when the salt resistivity is fixed. Natural-source methods such as that of Hoversten et al. lack the vertical resolution required for direct imaging of resistive hydrocarbon reservoirs, because they measure the earth's response to the flow of horizontal subsurface electrical currents that are insensitive to regions of increased resistivity. D. L. Alumbaugh and G. A. Newman, Geophys. J. Int., v. 128, 355-363, 1997; and SEG Annual Meeting Expanded Abstracts, v. 1, 448-451, 1998 have described the use of seismic constraints to improve resolution in cross-well electromagnetic imaging within hydrocarbon reservoirs, in a manner similar to that of Hoversten et al. for surface magnetotelluric data. However, the cross-well method requires the existence of at least two wells that penetrate the reservoir.

Estimation of the reservoir's fluid type, saturation, and shaliness factor from surface geophysical measurements has been previously conducted using only seismic reflection data, in particular various seismic interval attributes (amplitude widths, ratios, phases, etc.). Here, the shaliness factor is the ratio of net hydrocarbon bearing zone thickness (pay) to gross reservoir thickness. It is well known in the industry that the electromagnetic response of a vertically layered earth depends on the direction of the resistivity measurement. See, for instance, M. S. Zhdanov and G. V. Keller (1994, op. cit.). However, there is no existing remote (surface-based) electromagnetic method for measuring both the separate vertical and horizontal resistivities of a reservoir interval at depth. Directional resistivity measurements for reservoirs have been restricted to in-situ methods, such as well logging.

Specific technologies for indirect electromagnetic detection of reservoired hydrocarbons at depth have also been developed, but these rely on the detection of electrically altered zones ("chimneys") above reservoirs caused by the purported slow leakage of hydrocarbons upward from the reservoir. The existence and relationships of alteration chimneys to reservoired hydrocarbons have not been unequivocally demonstrated. Changes in resistivity (increases and decreases) and polarizability (or induced polarization) are claimed by the practitioners of chimney detection to occur at various locations within such chimneys. Electromagnetic methods to locate chimneys were developed by Sternberg et al., as described in their U.S. Pat. No. 4,446,434, and Tasci et al., as described in their U.S. Pat. No. 5,563,513. The TRANSIEL® and WEGA-D/PowerProbe systems can also be used to detect hydrocarbon chimneys. These methods suffer the same depth resolution limitations as listed above, for the reasons cited in the preceding paragraph.

SUMMARY OF THE INVENTION

The invention is a method for surface estimation of reservoir properties of a subsurface geologic formation. First, the location of and average earth resistivities above, below, and horizontally adjacent to the subsurface geologic formation are determined, using geological and geophysical data in the vicinity of the subsurface geologic formation. Second, the dimensions and probing frequency for an electromagnetic source are determined to substantially maximize transmitted vertical and horizontal electric currents at the subsurface geologic formation, using the location and the average earth resistivities. Next, the electromagnetic source is activated at or near surface, approximately centered above the subsurface geologic formation and a plurality of components of electromagnetic response are measured with a receiver array. Next, geometrical and electrical parameter constraints are determined, using the geological and geophysical data. Finally, the electromagnetic response is processed using the geometrical and electrical parameter constraints to produce inverted vertical and horizontal resistivity depth images.

In an alternative embodiment, the inverted resistivity depth images may be further combined with the geological and geophysical data to estimate the reservoir fluid and shaliness properties.

In a further alternative embodiment, the average earth resistivities above, below, and horizontally adjacent to the subsurface geological formation are verified using the plurality of components of electromagnetic response measured with the receiver array.

BRIEF DESCRIPTION OF THE DRAWINGS

The present invention and its advantages may be more easily understood by reference to the following detailed description and the attached drawings in which:

FIG. 5a is a plot of the axial vertical electric field complex magnitude $|E_z|$ versus the ratio of outer electrode radius over the inner electrode radius, b/a;

FIG. 5b is a plot of the total electrode current versus the ratio of outer electrode radius over the inner electrode radius, b/a;

While the invention will be described in connection with its preferred embodiments, it will be understood that the invention is not limited thereto. On the contrary, it is intended to cover all alternatives, modifications and equivalents that may be included within the spirit and scope of the invention, as defined by the appended claims.

DETAILED DESCRIPTION OF THE INVENTION

The invention is a method whereby the average vertical and horizontal formation resistivities of a hydrocarbon reservoir are remotely mapped from the land surface or the seafloor, using low-frequency electromagnetic waves constrained by seismic depth imaging and other a priori information about the subsurface. The invention overcomes the electromagnetic low vertical resolution problem by a combination of data acquisition and processing steps that are targeted at mapping the resistivity of a previously located or prospective reservoir.

Figure 1:
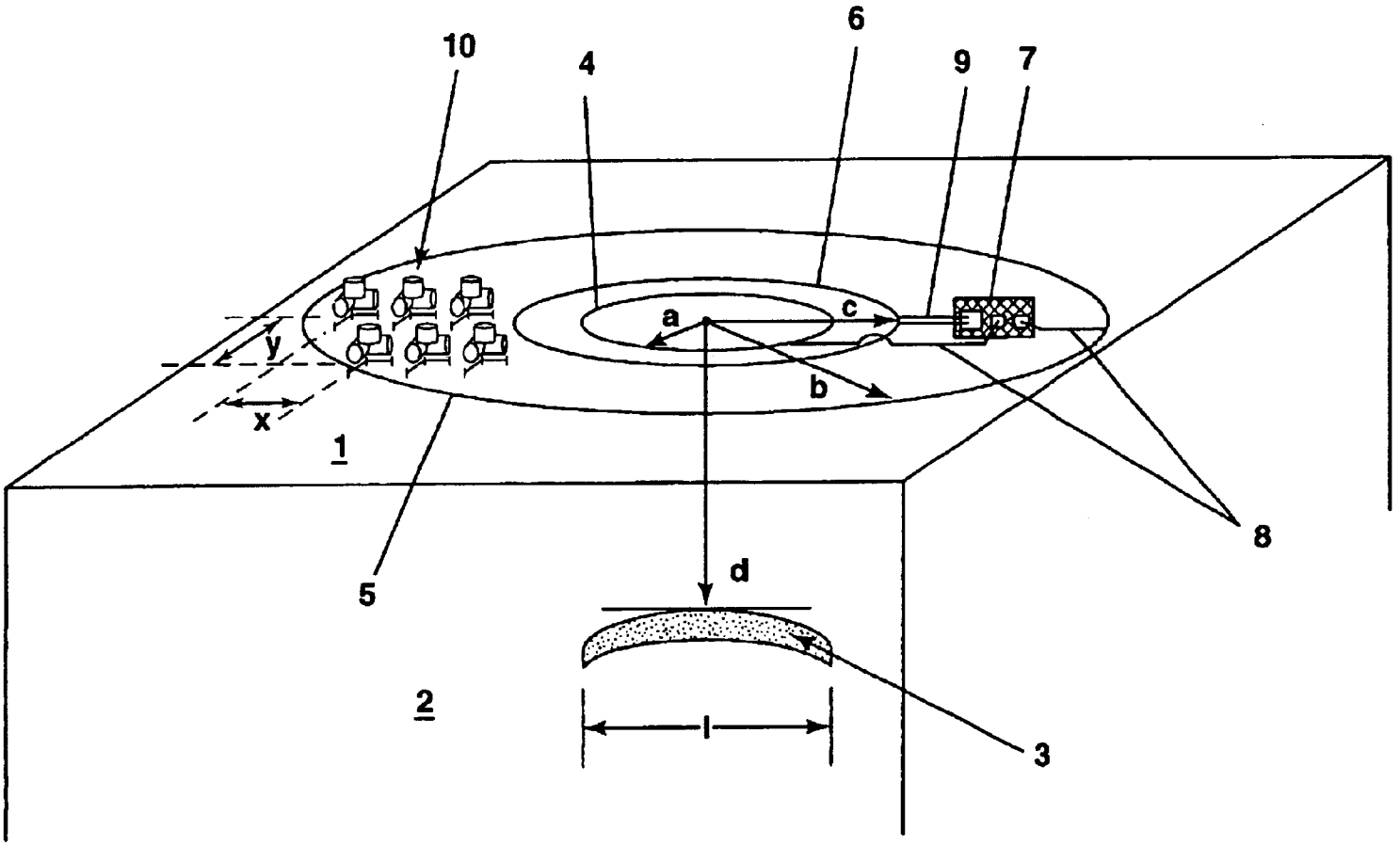
FIG. 1 is a perspective view of the preferred embodiment of the layout of the source and receiver apparatus used in the present invention for remote estimation of reservoir resistivities.

One embodiment of the layout of the apparatus used in the invention is shown in FIG. 1. In general, the invention uses the following four features that are synergistic in their combination: (1) a high-current multi-mode optimized electromagnetic source, (2) a multi-component receiver array, (3) 3-D wave-equation data processing, and (4) reservoir properties estimation and mapping. These four features will be described in turn.

In this embodiment of the present invention, two continuously grounded electrodes 4, 5, each consisting of one or more uninsulated electrical conductors, are buried at or within the near surface of the earth or the seafloor 1 in concentric circles of radii a and b respectively. Preferably, the electrodes are buried in the top zero to three meters. Alteratively, for offshore applications, the electrodes may be suspended or towed in the seawater above the seafloor as described by L. J. Srnka in U.S. Pat. No. 4,617,518. This electrode configuration provides for substantially maximizing a transmitted vertical electrical current to a reservoir target 3 at depth d within the earth 2. In an alternative embodiment, an optional insulated circular loop 6, consisting of one or more electrically insulated conductors, is arranged at the earth's surface or seafloor 1 in a circle of radius c concentric to the two continuously grounded electrodes 4, 5, for inducing horizontal electrical currents at the reservoir 3. Although the insulated circular loop 6 is shown positioned between the two continuously grounded electrodes 4, 5 in FIG. 1, the insulated circular loop 6 could be positioned inside the inner grounded electrode 4 or outside the outer grounded electrode 5. This insulated loop source 6 is used to augment natural background electric and magnetic field variations in the earth, to provide additional induced horizontal currents at the reservoir depth. The two grounded electrodes 4, 5 and the optional insulated source loop 6 are connected to one or more variable-frequency (preferably, $10^{-4}$-$10^{4}$ Hz) high current (preferably, $10^{2}$-$10^{6}$ Amperes) electrical power sources and controllers 7 by means of connecting cables 8, 9, preferably positioned radially. In the case of multiple sets of power sources and controllers 7, the connecting cables 8, 9 are preferably positioned equally around the circumferences of the grounded electrodes 4, 5. The power sources and controllers 7 may be located at the land surface or seafloor 1. Alternatively, in the case of offshore surveys, the power sources and controllers 7 may be located at the sea surface, or within the body of the sea. The power sources and controllers 7 provide for selective excitation of the grounded electrodes 4, 5 and insulated wire loop 6, modifying the frequency as required to maximize the subsurface response.

The dimensions and probing frequency for a given reservoir depth and average earth resistivity, plus the corresponding electrical impedance of the grounded electrodes 4, 5, are calculated by numerically solving the uninsulated buried low-frequency electromagnetic antenna problem. Preferably, this problem is solved using the methods of R. W. P. King and G. S. Smith, Antennas in Matter, MIT Press, Cambridge, 1981. Preferably, the solution is implemented by means of a 3-D frequency-domain computer program in which the surface potentials, current densities, and electric fields are found by solving Maxwell's equations using 2-D complex Fourier transforms at each depth interval. Boundary conditions for solving the problem are applied to enforce the condition that, at each frequency, the total current leaving the inner ring 4 equals the total current captured by the outer ring 5, and that the voltage difference between the rings 4, 5 is conserved. Preferably, the values of radii a and b are determined by substantially maximizing the vertical and horizontal electric fields at the symmetry axis of the concentric rings 4, 5 (radius r=0) at the depth of the center of the reservoir. FIGS. 3, 4a, 4b, 5a, and 5b show results from this calculation for sample input values. The sample input values affect the absolute values of the electric fields and currents, but do not affect the dimensionless scaling parameters used to optimize the source electrodes. Thus, in FIGS. 3, 4a and 4b, the shape of the curves would remain the same for the same ratio of outer electrode radius to inner electrode radius b/a=8, while the absolute magnitude of the curves would change for different values of average earth resistivity and source excitation voltage. Similarly, in FIGS. 5a and 5b, the shape of the curves would remain the same for the same ratio of depth to inner electrode ratio d/a=2/3, while the absolute magnitude of the curves would change for different values of average earth resistivity and source excitation voltage. These ratios and values were selected for illustrative purposes only and should not be taken as limitations of the method of the present invention.

Figure 3:
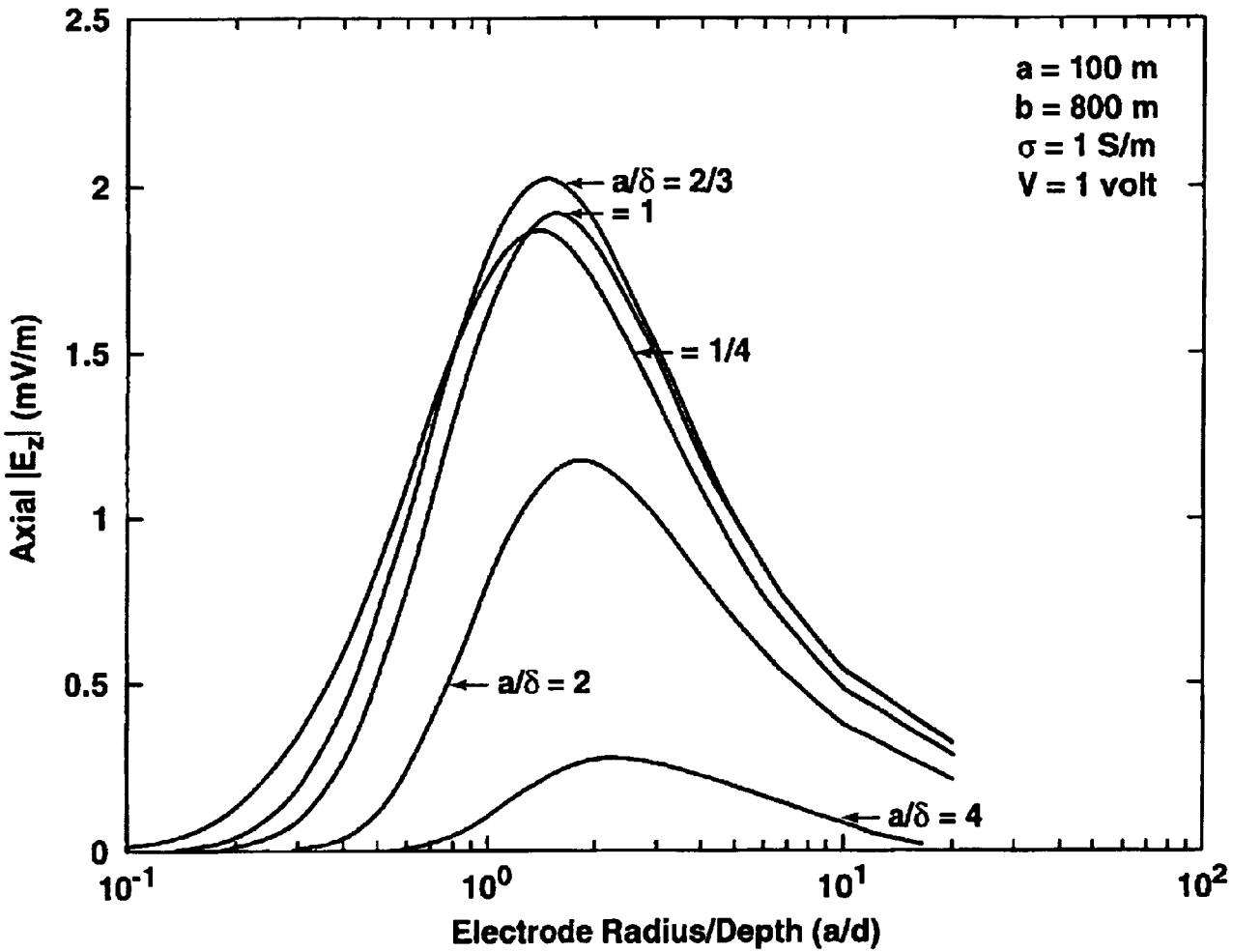
FIG. 3 is a plot of the axial vertical electric field complex magnitude $|E_z|$ as a function of the ratio of inner electrode radius over depth, a/d, for various values of the ratio of the inner electrode radius over electromagnetic skin depth, a/δ.

FIG. 3 gives the axial (radius r=0) vertical electric field complex magnitude $|E_z|$ (in millivolts/meter) as a function of a/d for various values of the ratio a/δ, per unit voltage (1 Volt) of source excitation between the grounded electrode rings 4, 5, where $\delta=503\times(\rho/f)^{1/2}$ is the electromagnetic skin depth in meters. Here, ρ is average earth resistivity and f is source excitation frequency.

Figure 4A:
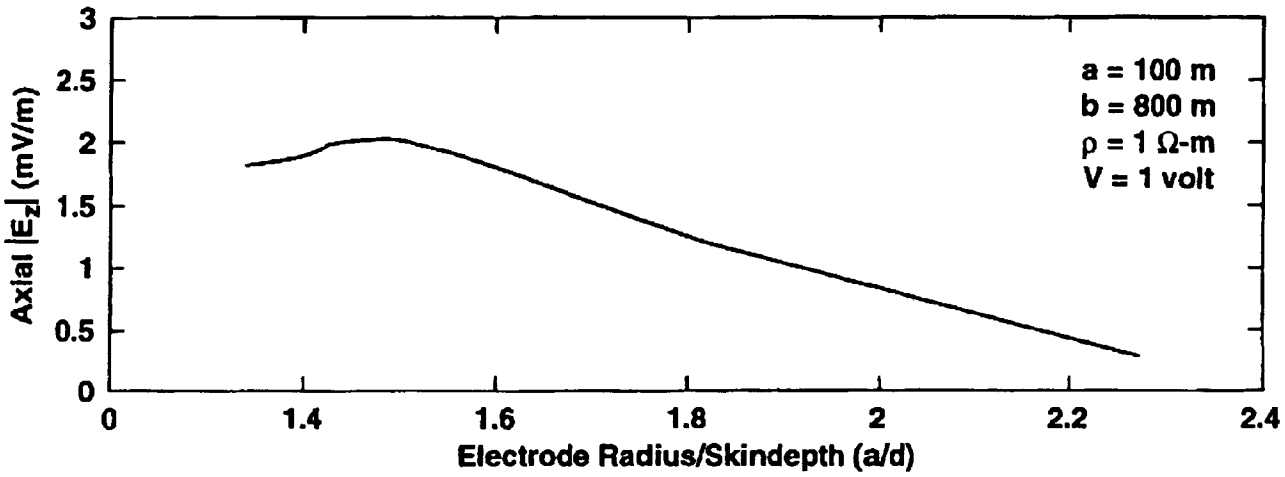
FIG. 4a is a plot of the axial vertical electric field complex magnitude $|E_z|$ versus the ratio of inner electrode radius over the depth, a/d.
Figure 4B:
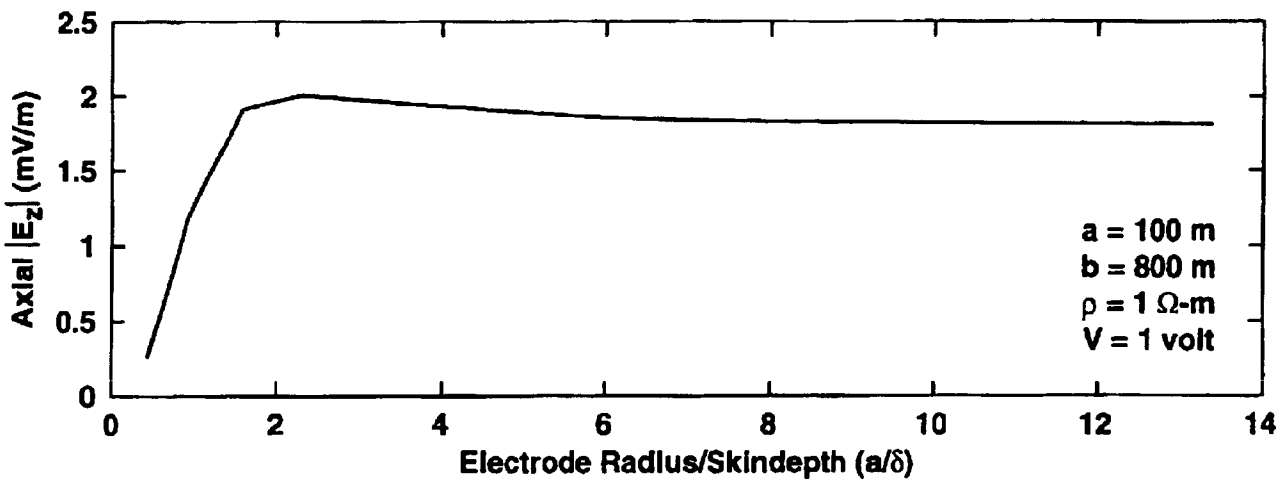
FIG. 4b is a plot of the axial vertical electric field complex magnitude $|E_z|$ versus the ratio of inner electrode radius over the electromagnetic skin depth, a/δ.

FIGS. 4a and 4b are plots of the axial vertical electric field complex magnitude $|E_z|$ versus the ratio of inner electrode radius over the depth, a/d and the ratio of inner electrode radius over the electromagnetic skin depth, a/δ, respectively. FIGS. 3 and 4a show that the axial $|E_z|$ is maximized when $a/d\approx 3/2$ and $a/\delta\approx 2/3$. Thus, $|E_z|$ is maximized when $d/\delta=(a/\delta)/(a/d)\approx 9/4$, as shown in FIG. 4b.

Figure 5A:
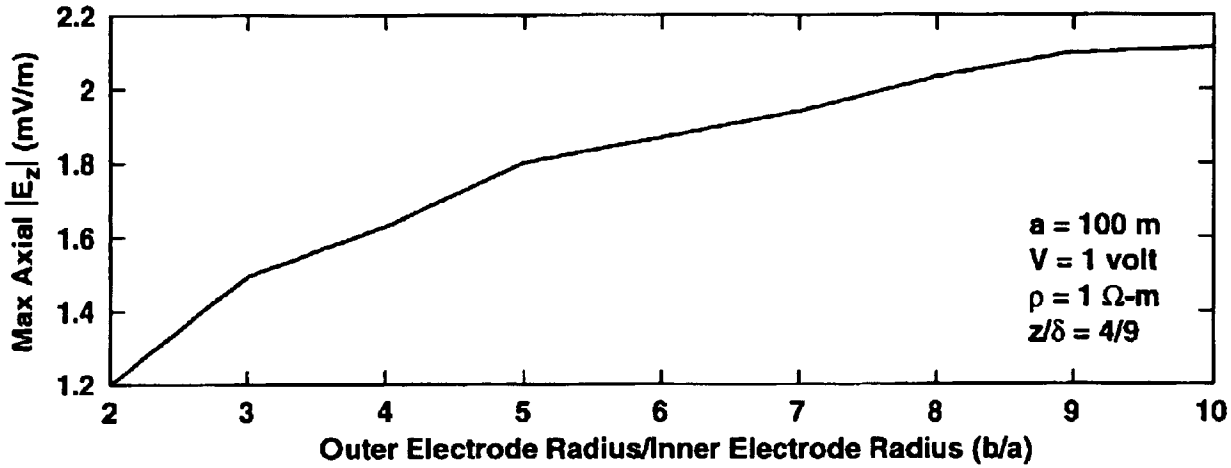
Figure 5B:
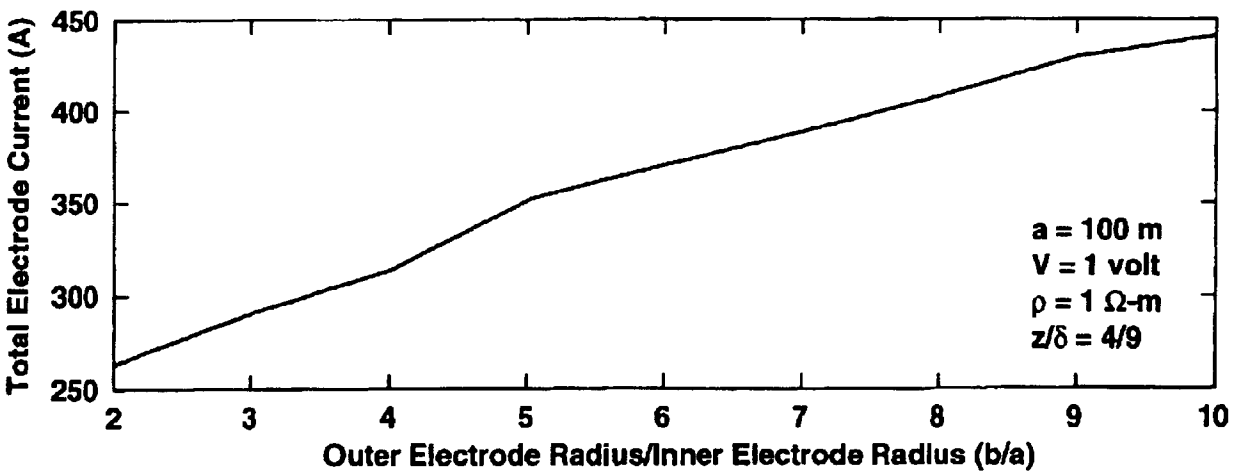

FIGS. 5a and 5b show the dependence of axial $|E_z|$ and total electrode current on the ratio of outer electrode radius over the inner electrode radius, b/a, per unit source voltage. A value of $b/a\geqq 9$ maximizes $|E_z|$ at the reservoir.

Preferably, the radius c of the insulated ring source 6 (vertical magnetic dipole) is $c\leqq a$, based on results from B. R. Spies (1989, op. cit.) for electromagnetic inductive sounding in the near-field zone of a vertical magnetic dipole source.

Figure 2:
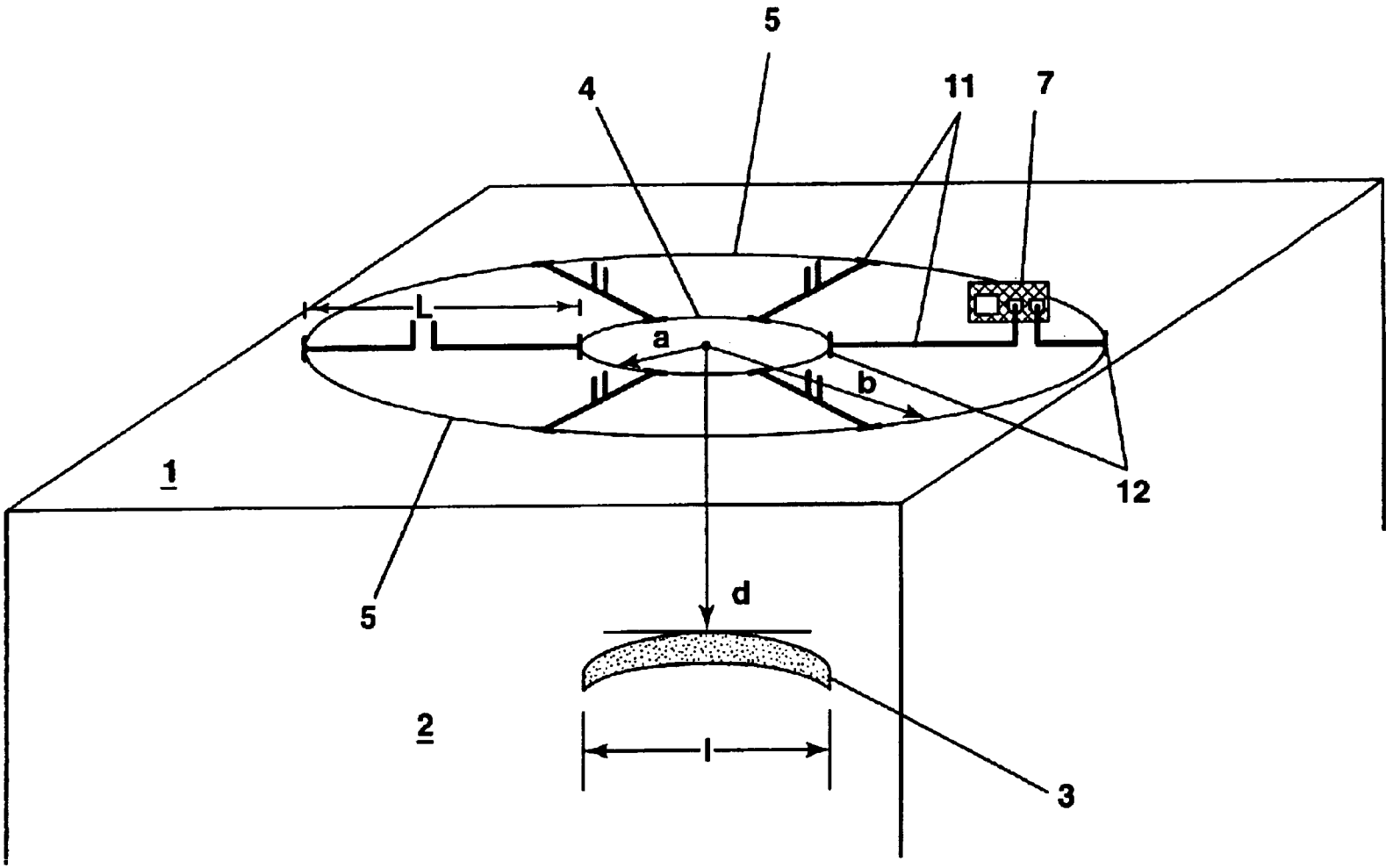
FIG. 2 is a perspective view of an alternative embodiment of the layout of the source and receiver apparatus used in the present invention for remote estimation of reservoir resistivities.
Figure 6:
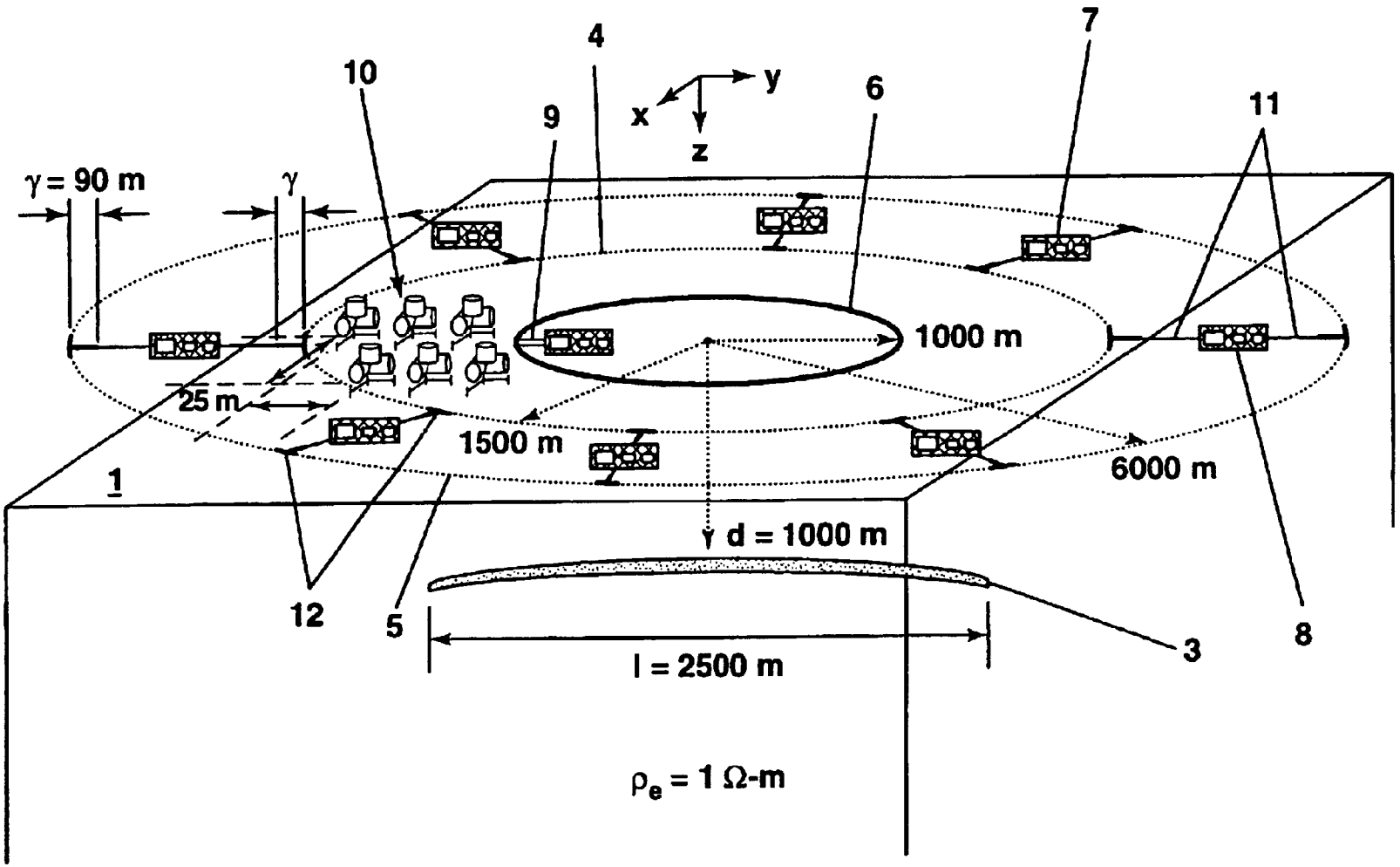
FIG. 6 is a perspective view showing the configuration of the alternative embodiment of the layout of the source and receiver apparatus used in the present invention for remote estimation of reservoir resistivities, as used in the example.

An alternative embodiment of the grounded electrodes is shown in FIG. 2. The two concentric ring electrodes 4, 5 of respective radii a and b are replaced by six or more linear grounded electrodes 11 of equal lengths L=b−a. Preferably, these electrodes 11 will be continuously grounded to the earth along their entire individual lengths L. Alteratively, the electrodes 11 may be only partially grounded, that is, continuously grounded only within some distance $\gamma\leqq L/2$ as measured from the radii a and b, respectively, as shown in FIG. 6. Preferably, the electrodes 11 are placed along radii separated by equal angles of not more than 60°, whose inward radial projections intersect at the center of the electrode array. Preferably, each linear electrode 11 is connected at each of its ends (r=a and r=b) to a continuously grounded linear terminating electrode 12 that is substantially orthogonal (preferably, 90°±10°) to the connected radial electrode 11. Preferably, the length of each terminating electrode 12 is not more than L/10. Preferably, one or more power sources and controllers 7 are connected to the radial linear electrodes 11 near the midpoints L/2 of the electrodes 11 within a distance of ±L/10. If more than one power source 7 is used simultaneously, the multiple sources 7 operate in a synchronized manner to supply electrical current to each electrode 11. Preferably, source synchronization is such that the total phase variations of the six or more source currents do not exceed 0.1 degree and the total amplitude variations of the source currents do not exceed 0.1 percent. In this alterative embodiment employing grounded electrodes 11, the optional insulated circular wire loop 6 may also be used, as described above and shown in FIG. 6. The power sources 7 operate in a discrete-frequency ("frequency domain") or a variable-sequence alternating wave ("time domain") transient manner. In both cases, the plurality of the source currents is reversed periodically (preferably, $10^{-4}$ to $10^{4}$ seconds) as in standard commercial practice well known to those of skill in the art, in order to minimize electrode polarization effects.

Electromagnetic responses are collected by an array of multi-component receivers 10 positioned at the surface of the earth or at the seafloor 1, as shown in FIGS. 1 and 6. Preferably, two orthogonal horizontal electric fields, two orthogonal horizontal magnetic fields, and a vertical magnetic field are measured, when the array of receivers 10 is positioned on land. Preferably, the orthogonal horizontal directions are the same for all receivers 10. Preferably, an additional vertical electric field component is also measured when the array of receivers 10 is positioned at the seafloor 1. Preferably, receiver signal amplitudes and phases are measured with an accuracy greater than or equal to 0.1 %, relative to the source fields, using commercially available broadband (preferably, $10^{-4}$ to $10^{4}$ Hz) electric and magnetic sensors that have standard high sensitivity, and a receiver system dynamic range given by a capacity of 24 bits or more. Preferably, the magnetic field sensors have phase accuracy greater than or equal to 0.1 degree over the frequency range used for the survey. In the preferred embodiment of the method of this invention, these multi-component responses at each receiver 10 are also recorded when the grounded and ungrounded sources 7 are turned off, to measure the earth's electromagnetic response to the natural background electric and magnetic fluctuations and also to measure the electromagnetic noise environment.

Preferably, electromagnetic responses are measured at each receiver site over a gird having receiver spacing intervals x and $y \leqq 0.5$ d, where d is the vertical distance (depth) from the land surface or seafloor 1 to the reservoir 3, as shown in FIGS. 1, 2, and 6. The x and y intervals may differ. Alternatively, linear receiver arrays (one or more parallel lines of receivers 10) may also be used. The linear arrays may also be arranged in swath geometry, in which case the receiver data may be summed in the cross-line direction. Preferably, receivers 10 are positioned in a grid pattern, as descried above, over the entire area from the center of the source array out to a radial distance r=b. The few receivers 10 shown in FIGS. 1 and 6 illustrate the inter-receiver spacing dimensions without showing the extent of the preferred coverage, and thus should not be taken as a limitation of the present invention. This positioning maximizes the data sensitivity to the reservoir 3 and other electrical structures within the earth 2 near the reservoir 3, and provides the greatest depth of penetration (the "near-field" response) for a given electrical or magnetic dipole source moment M.

The spatial positions and orientations at the earth's surface or seafloor 1, of the source electrodes 11, and of the receivers 10 in the array are measured. Preferably, the positioning and orientation is accomplished using geodetic methods standard in the industry and well known to those of skill in the art. These geodetic methods may include differential and kinematic GPS (Global Positioning Satellite), and acoustic transponders in an offshore application. Preferably, maximum allowed position uncertainties are ±0.001 d in the vertical and the two horizontal directions. Preferably, maximum allowed orientation uncertainties are ±0.10 degrees in the vertical and in the two horizontal orientations.

Preferably, the multi-component electromagnetic receiver data are processed using full wave-equation methods. This 3-D processing includes, but is not limited to, data noise suppression, source deconvolution, and model-guided inversion. Both frequency-domain and time-domain methods are used, depending upon the methods used for the data acquisition. Alternatively, electromagnetic wave-equation migration may be used such as that described by M. Zhdanov et al, Exploration Geophysics, v 26, 186-194, 1995; M. Zhdanov and O. Portniaguine, Geophys. J. Int., v 131, 293-309, 1997; and M. Zhdanov et al, SEG Annual Meeting Expanded Abstracts, v. 1, 461-468,1998.

Preferably, standard electromagnetic industry data processing techniques such as those described by M. N. Nabighian (1988, op. cit.); K.-M. Strack (1992, op. cit.); G. Buselli and M. Cameron, Geophysics, v. 61, 1633-1646, 1996; and G. D. Egbert Geophys. J. Int., v. 130, 475-496, 1997 are used for suppression of both natural background and human-generated electromagnetic noise. Preferably, data redundancy from multiple-receiver multi-component responses and from many source repetitions, combined with local noise measurements and signal cross-correlation techniques, are used within these standard methods to achieve noise suppression. Preferably, such techniques are applied to the data to produce a signal-to-noise ratio greater than or equal to 1 and signal accuracy greater than or equal to 1.0% for each electromagnetic component used within the multi-component data inversion.

The electromagnetic source signature (source-generated noise) is suppressed automatically by the self-canceling field geometry of the grounded electrodes (4 and 5 in FIG. 1, 11 and 12 in FIG. 2), as described by Mogilatov and Balashov (1996, op. cit.). Additional suppression (deconvolution) of source effects is accomplished by normalizing the receiver data to the background earth response using standard industry techniques well known in one of skill in the art, such as described in M. Zhdanov and G. Keller, (1994, op. cit.) or K. M. Strack (1992, op. cit.). Alternatively, this suppression may be accomplished by normalizing (cross-referencing) the data using apparent resistivity functions for a layered earth as described in T. G. Caldwell and H. M. Bibby, Geophys. J. Int., v. 135, 817-834, 1998.

Preferably, the data from the array of receivers 10 are converted ("inverted") from time or frequency domain electromagnetic responses into a 3-D resistivity depth image of the earth by the application of iterative 3-D model-guided nonlinear electromagnetic inversion methods that incorporate geometrical and electrical parameter constraints, as will be described below. Finite-difference and finite-element 3-D models may be used. Inversion methods used in this invention include standard techniques such as quasi-linear regularized methods, such as described in M. S. Zhdanov and S. Fang, Radio Sci., v. 31, 741-754, 1993 and fully nonlinear conjugate gradient or Gauss-Newton methods, such as described in G. A. Newman and D. L. Alumbaugh, Report SAND96-0582, Sandia National Laboratories, 1996; and Geophys. J. Int., v. 128, 345-354, 1997; Alumbaugh and Newman op. cit., 1997 and SEG Annual Meeting Expanded Abstracts, v. 1, 456-459, 1998. Preferably, the positions and strengths of all source currents applied at or within the surface of the land surface and at, above, or within the seafloor 1 are explicitly included in the inversion, by means of Green's functions or other standard mathematical techniques that are well known to one of skill in the art. Preferably, separate inversions are performed for receiver data collected using the grounded electrode sources (4 and 5 in FIG. 1, 11 and 12 in FIG. 2) and for receiver data collected using the insulated loop source 6 and the earth's natural background magnetotelluric source when the other sources are turned off. Preferably, joint inversions of receiver data collected using any combination of the grounded source (4 and 5 in FIG. 1, 11 and 12 in FIG. 2), insulated source 6, and magnetotelluric source are also performed.

Preferably, the spatial positions of geometrical constraints are obtained from surfaces, such as horizons and faults, interpreted in dense 2-D or in 3-D depth-converted stacked seismic reflection data. Preferably, standard industry seismic interpretation packages, such as Geoquest IESX©, Paradigm GeoDepth©, or Jason Workbench©, are used to produce the interpreted seismic surfaces, to tie the seismic depth data to well log, gravity, magnetic, and other geoscience data, and to transfer these depth surfaces to the 3-D electromagnetic inversion starting model. Resistivity values for the initial electromagnetic depth model for geologic units bounded by the interpreted seismic surfaces are produced by any of a number of standard industry methods well known to one skilled in the art. These methods include ties to log data; extrapolation from regional data bases; application of empirical resistivity transforms using seismic intervals, well sonic velocities, or acoustic impedances; and initial layered-earth (1-D) resistivity inversion derived from the collected electromagnetic receiver data. Preferably, constraints are enforced during the inversion using standard industry techniques, such as described in M. A. Meju, Geophysical Data Analysis: Understanding Inverse Problems and Theory, Society of Exploration Geophysicists, 1994. These standard techniques include Tikhanov regularization, Bayesian methods, sharp-boundary approaches (G. Hoversten et al., 1998, op. cit.), equivalent integral conductance and resistance methods, and minimum gradient support techniques (O. Portniaguine and M. Zhdanov, 1998, op. cit.).

In an alternative embodiment of the invention, interpretation of the inverted resistivity depth cubes ("inversions") includes comparison of the 3-D resistivity-depth values with interpreted 3-D seismic features and all mapped attributes derived from the seismic data (pre-stack and post-stack). Preferably, the separate and mathematically joint electromagnetic inversions produced from the grounded electrode sources and from the insulated loop source and magnetotelluric source are compared and combined with each other and with the seismic reflection features and seismic attributes to estimate the fluid type, hydrocarbon pore volume, saturation, and the shaliness factor (net pay-to-gross reservoir thickness ratio) within the reservoir over its mapped extent. The reservoir may be seismically defined by a combination of stratigraphic or structural closure or limits of mapped seismic attributes.

The preferred method of this alternative embodiment of the invention to estimate fluid type, hydrocarbon pore volume, saturation and shaliness factor is as follows. The resistivity inversion at the reservoir depth produced from electromagnetic receiver data collected using the grounded electrode sources is used to measure the vertically averaged resistivity $\rho_{vert}$ within the reservoir 3. The resistivity inversion at the reservoir depth produced from electromagnetic receiver data collected using the insulated source or the magnetotelluric source is used to measure the horizontally averaged resistivity $\rho_{horiz}$ within the reservoir. A facies model of the reservoir is derived from the seismic interpretation, geologic concepts, and available facies data (such as well logs and data bases). This facies model is combined with the $\rho_{vert}$ and $\rho_{horiz}$ inversion measurements to estimate products and ratios of the permeable bed resistivity $\rho_{ss}$, the summed permeable bed thickness divided by the total reservoir interval thickness ntg ("net-to-gross"), and the impermeable bed resistivity $\rho_{sh}$. For a reservoir facies model comprised of uniform values $\rho_{ss}$ for the permeable beds, and a different but uniform value $\rho_{sh}$ for the impermeable beds, then, as it is known in the industry:

$$\rho_{vert}=\rho_{ss}\times\text{ntg}+\rho_{sh}\times(1-\text{ntg}) \quad (1)$$

$$1/\rho_{horiz}=(1/\rho_{ss})\times\text{ntg}+(1/\rho_{sh})\times(1-\text{ntg}) \quad (2)$$

Equations (1) and (2) contain three unknown averaged reservoir parameters: $\rho_{ss}$, $\rho_{sh}$, and ntg. Estimates of $\rho_{sh}$ within the reservoir interval, derived independently from the facies model or available facies data, are used next to derive and map the two remaining unknown values $\rho_{ss}$ and ntg over the spatial extent of the reservoir. Reservoir fluid type, hydrocarbon pore volume or water saturation are then derived from the mapped $\rho_{ss}$ value within the area of the seismically defined reservoir. Statistical methods including Monte Carlo inversions may also be used for deriving hydrocarbon pore volume, net-to-gross, water saturation, and other reservoir properties from the $\rho_{vert}$ and $\rho_{horiz}$ inversion measurements. The derivation uses the facies model of rock properties distributions combined with Archie's Equations for the electrical resistivity of a porous rock containing fluid in the pore spaces, relative to $\rho_{ss}$ values within the same geologic unit outside of the reservoir.

The invention described above is designed to provide an order of magnitude improvement in subsurface vertical electromagnetic resolution over current technology.

Figure 9:
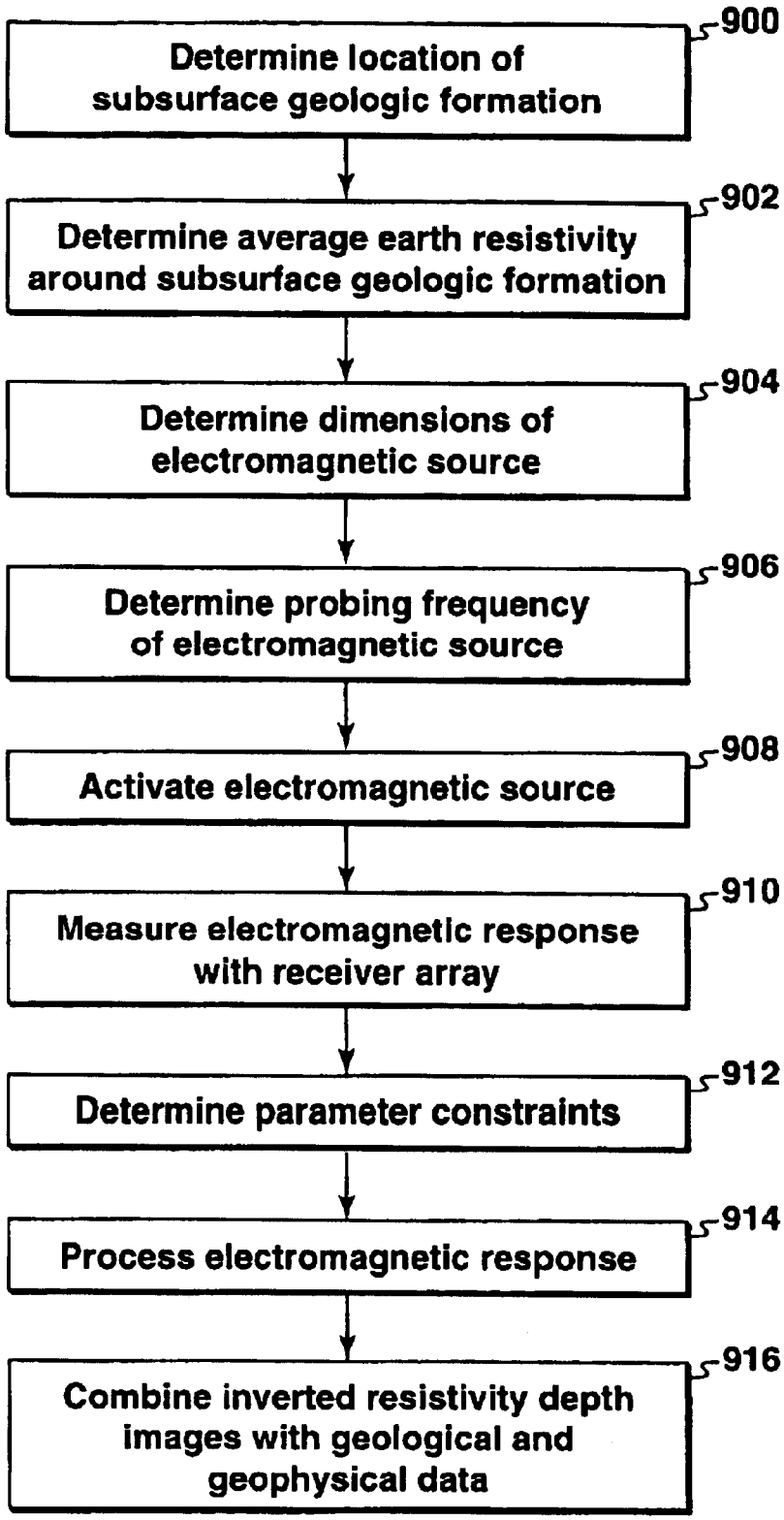
FIG. 9 is a flowchart illustrating the processing steps of an embodiment of the method of the present invention for surface estimation of reservoir properties.

FIG. 9 is a flowchart that illustrates a preferred embodiment of the method of the invention for surface estimation of reservoir properties of a subsurface geologic formation, as just described. First, at step 900, location of the subsurface geologic formation is determined, using geological and geophysical data in the vicinity of the subsurface geologic formation. Next, at step 902, average earth resistivities above, below, and horizontally adjacent to the subsurface geologic formation is determined, using geological and geophysical data in the vicinity of the subsurface geologic formation. Next, at step 904, dimensions for a high-current multi-mode electromagnetic source are determined to substantially maximize transmitted vertical and horizontal electric currents at the subsurface geologic formation, using the location and the average earth resistivities. Preferably, the dimensions are calculated by numerically solving the uninsulated buried low-frequency electromagnetic antenna problem, as described previously. Next, at step 906, probing frequency for a high-current multi-mode electromagnetic source is determined to substantially maximize transmitted vertical and horizontal electric currents at the subsurface geologic formation, using the location and the average earth resistivities. Again, the probing frequency preferably is calculated by numerically solving the uninsulated buried low-frequency electromagnetic antenna problem, as described previously. Alteratively, iterated 3-D modeling calculations of the subsurface geologic formation's electromagnetic response may be used to verify the dimensions and probing frequency of the high-current multi-mode electromagnetic source in steps 904 and 906. Next, at step 908, the electromagnetic source is activated at or near the surface, approximately centered above the subsurface geologic formation. Next, at step 910, a plurality of components of electromagnetic response are measured with a receiver array. Preferably, when the array of receivers 10 is positioned on land, two orthogonal horizontal electric fields, two orthogonal horizontal magnetic fields, and a vertical magnetic field are measured. Alternately, when the array of receivers 10 is positioned offshore, an additional vertical electric field is measured. Next, at step 912, geometrical and electrical parameter constraints are determined, using the geological and geophysical data. Next, at step 914, the electromagnetic response is processed using the geometrical and electrical parameter constraints to produce inverted vertical and horizontal resistivity depth images. Preferably, the components of the electromagnetic response are processed using full 3-D wave-equation methods, as described previously. 1-D inversion of the electromagnetic response is used to verify the average earth resistivities above, below, and horizontally adjacent to the subsurface geologic formation, as determined in step 902. Finally at step 916, the inverted resistivity depth images are combined with the geological and geophysical data to estimate the reservoir properties. Details of the preferred method of inversion are described later in conjunction with the following example.

The following example illustrates the application of the invention for onshore (land) hydrocarbon reservoir resistivity mapping. After 3-D seismic data in the survey area are acquired, interpreted, and converted to the depth domain, the prospective reservoir is identified (depth d and extent 1). Knowledge of the earth's electrical resistivity for the survey area, averaged over intervals of 0.10×d, from the earth's surface to three times the reservoir depth (3×d) and five times the reservoir extent (5×1), is gathered using existing electromagnetic survey data and well logs, or is estimated using geologic basin analogs. The diameters of the grounded electrodes are calculated by numerically solving the uninsulated buried low-frequency electromagnetic antenna problem as discussed above, or by iterated 3D electromagnetic modeling, using the reservoir depth and vertically averaged layered-earth resistivities as inputs. The diameter of the optional insulated loop electrode is determined using standard methods known in the art.

FIG. 6 shows land source and receiver configurations for a target reservoir 3 identified seismically at d=1000 meters depth to top of reservoir, having an average lateral extent (radius) 1/2=1250 meters. Eight (8) partially grounded radial electrodes 11 and connected terminating electrodes 12, as described also in FIG. 2, are deployed in a radial array in conjunction with an insulated loop source 6. The geometrical center of the grounded electrode array (intersection of their 8 radius lines) and the center of the insulated loop are positioned at the surface of the earth 1 vertically above the center of the reservoir target. The grounded electrodes are positioned symmetrically around the circumference of the source array, each separated by an angle of 45±1 degrees from the adjacent electrode as measured from the center of the source array. The source dimensions are a=1500 meters, b=6000 meters, $\gamma$=90 meters, and c=1000 meters. The value $\gamma$ is determined from the calculation of vertical current leakage from a continuously grounded bipole antenna of length L, using the method described above to numerically solve the uninsulated buried low-frequency electromagnetic antenna problem. This shows the most of the current leaves the grounded wire within a distance$\leqq$L/5 at each end of the antenna. The grounded terminating electrodes 12 each have a length of 30 meters. The grounded array and the insulated loop are not moved during the survey. Alternatively, if the number of power sources/controllers 7 is limited, or if survey logistics or terrain difficulties make simultaneous use of the eight radial grounded electrode positions impractical or too costly, the eight radial partially grounded electrode positions are occupied sequentially in groups of one or more positions, in any sequential order.

A preferred procedure is to obtain substantially optimal parameter values to substantially maximize the electric filed at the reservoir depth. However, as an alternative procedure, a sub-optimal aspect ratio b/a could be used to reduce electrode cost, installation effort, and survey permitting. For instance, an aspect ratio b/a=4 could be used. Use of this value for b/a would result in a 24.5% reduction in vertical electric field at the reservoir target, as shown in FIG. 5a, and a corresponding reduction in the electromagnetic responses of the reservoir to the grounded electrode excitation as measured at the surface receiver array 10.

Assume a vertically averaged resistivity of the earth of value $\rho_e$=1 Ohm-m. Then the central operating frequency of the grounded electrode array is derived from d/$\delta$=9/4 and d=2250 meters, or f=0.050 Hz. The output bandwidth of the grounded electrode sources is 0.005$\leqq$f$\leqq$5.0 Hz. Using the analysis of B. R. Spies (1989, op. cit.), the central operating frequency of the insulated loop source is set by d/$\delta$=1, or f=0.253 Hz. The output bandwidth of the insulated loop source is 0.025$\leqq$f$\leqq$25 Hz.

Nine power sources/controllers 7 are placed at the surface of the earth 1. Each source/controller is powered by connection to a municipal power grid, if available, or is powered by one or more generators in the field survey area. Each source/controller is nominally rated at 300 kVA, with outputs of 120 VAC and 2500 A (rms). One source/controller is situated at any position along the circumference of the insulated loop source 6, and is connected by a coaxial power cable 9 at the surface of the earth to the insulated loop source. The remaining eight power sources/controllers 7 are placed within a distance of L/10 of the midpoints of the partially grounded electrodes, as shown in FIG. 2. These eight power sources/controllers are connected to the grounded electrodes by means of coaxial or single-conductor power cables 8. The satellite Global Positioning System (GPS) signal is used to monitor and synchronize the phases of all the sources. Alternatively, if the number of power sources/controllers 7 is limited, or if survey logistics or terrain difficulties make simultaneous use of the eight radial grounded electrode positions impractical or too costly, one or more power sources/controller may be used to energize separately the eight partially grounded and the insulated loop source, in any sequential order.

The partially grounded electrodes 11 and the terminating electrodes 12 each consist of three uninsulated size 4/0 multi-strand copper wires. The grounded wires that comprise the grounded portion of each partially grounded electrode element 11 are buried in parallel within the top 1.0 meter of the earth's surface by means of manual digging or standard mechanical cable-laying devices. The ungrounded portions of each of the radial partially grounded electrodes 11 consist of three uninsulated size 4/0 multi-strand copper wires that are connected to the uninsulated buried electrode wires comprising the grounded portions. The ungrounded portions of each radial electrode are laid on the surface of the earth. Electrical contact of the grounded radial electrodes and the terminating electrodes is maintained with the earth by periodically wetting the buried electrode areas with water, as needed according to local ground moisture conditions. The loop source 6 consists of one single-conductor multi-strand insulated size 4/0 copper wire. Power connection cables 8 and 9 are electrically rated according to U.S. NEMA (National Electrical Manufacturing Association) codes and standards to carry the current delivered to the grounded electrodes 11,12 and to the insulated loop 6, respectively.

Electromagnetic receivers 10, such as Electromagnetic Instruments, Inc. (EMI) type MT-24/NS™ or equivalent, are positioned over the surface of the earth 1 within a radial distance $r=(x^2+y^2)^{1/2}$=5000 meters from the center of the array, but not within 25 meters of any grounded electrode 11, 12 or the insulated loop 6, to minimize source-generated noise and saturation of the receiver signals. The receivers are positioned on a uniform grid as shown in FIG. 6, with a lateral spacing of x=y=100 meters, within a radius of 2000 meters from the center of the array, and on a uniform grid with a lateral spacing of x=y=300 meters from a radius of 2500 meters to a radius of 5000 meters from the center of the array. Each five-channel receiver measures two components (x and y directions) of the horizontal electric field, two components (x and y directions) of the horizontal magnetic field, and one component (z direction) of the vertical magnetic field. The receivers are modified by standard industry methods including feedback stabilization so that the phase accuracy of the magnetic field induction sensors (EMI type BF-4™ or equivalent) is greater than or equal to 0.10 degrees in the full frequency range of the survey ($0.005 \leqq f \leqq 25$ Hz).

The five-component receivers are deployed simultaneously in large groups (16 or more) within the survey area, with as many receiver groups deployed as possible and practical for the local conditions of the survey (e.g. terrain difficulties, logistical support). Data are gathered for each receiver group by a central processing unit (EMI type FAM/CSU™ or equivalent). Differential GPS geodetic methods are used to measure the positions (x, y, z) of all receivers to within 0.1 meters accuracy. The GPS signal is also used for phase synchronization (timing) of all receiver data.

Figure 7:
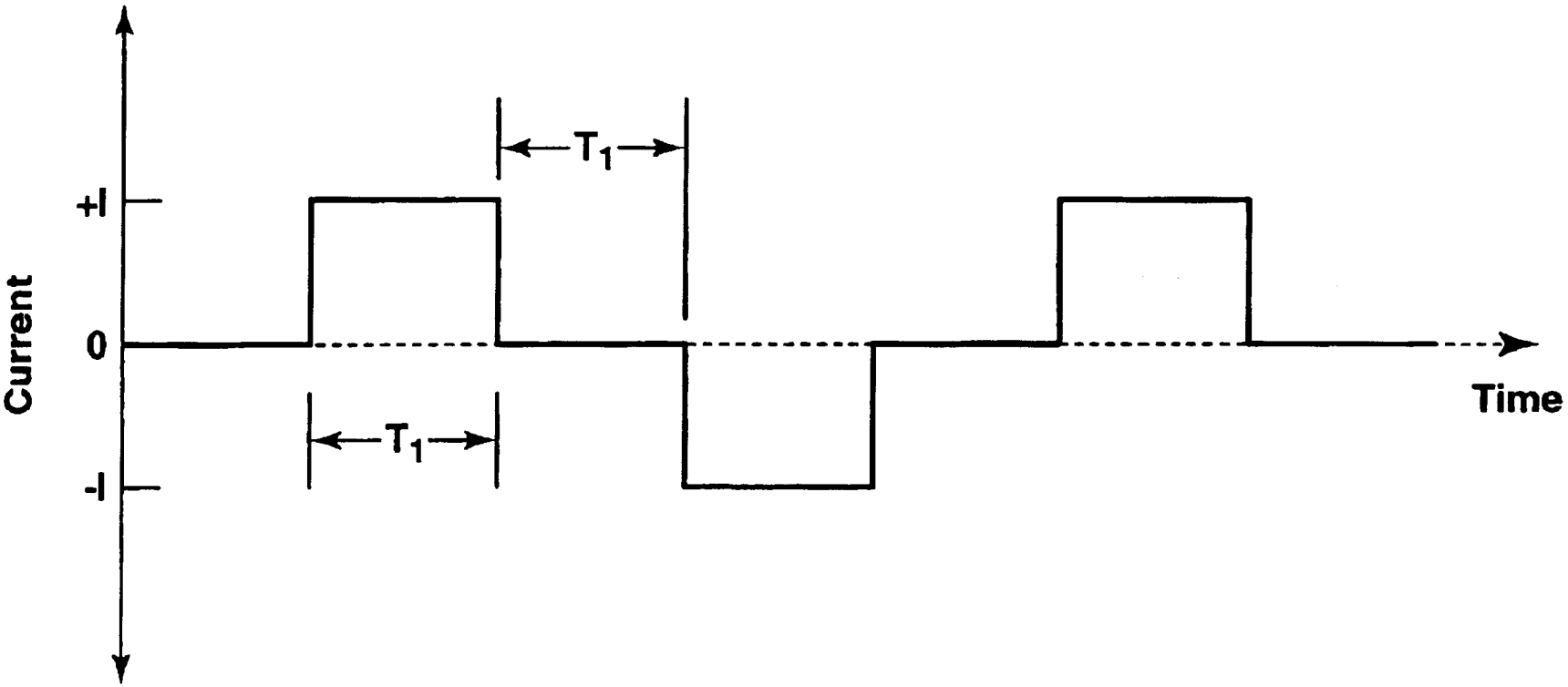
FIG. 7 illustrates a bipolar square current waveform as output by the electromagnetic power source for use in the method of the present invention.

The receiver data are collected in three ways. First, the receiver data are collected as time records with all sources 7 turned off, to record zero excitation currents. These data are collected over a length of time that is sufficient to record raw stacked magnetotelluric data having three-sigma errors less than or equal to 5% over the frequency range $0.0025 \leqq f \leqq 25$ Hz. Typically, collection of this data will take 1-10 days, depending upon local conditions and the logistics of receiver deployment. This first set of receiver data is magnetotelluric data. Second, the insulated loop source is energized using a standard electromagnetic industry bipolar square wave current from its attached power source/controller 7, as shown in FIG. 7. In this preferred embodiment of the method of the present invention, current pulse on-time, $T_1$ equals current waveform off-time, $T_2$, that is, $T_1=T_2$, but this is not a limitation of the method. Other source current waveforms may also be used for the insulated loop source current, including sinusoidal waveform combinations and pseudo-random sequences as well known to one skilled in the art, provided the insulated loop source frequency range is as stated. The receiver responses are collected using time-domain measurements acquired during the current waveform off-time, $T_2$ in FIG. 7. The duration of the current pulse on-time, $T_1$ in FIG. 7 (and hence also the off-time $T_2$), is set at three values, 0.01, 1.0, and 10.0 seconds. Sufficient repetitions (typically 50 to 1000) of the loop source current are made at each on-time value so that the raw stacked data time series data have three-sigma errors less than or equal to 1% over the frequency range $0.025 \leqq f \leqq 25$ Hz. This second set of receiver data is vertical magnetic dipole data. Third, the insulated loop source is turned off (zero current) and the eight partially grounded electrodes 11, 12 are simultaneously energized in phase. Alternatively, if the number of power sources/controllers is limited, the partially grounded electrodes are energized separately in groups of one or more, in any sequential order. Each of the eight power sources/controllers 7 produces a standard electromagnetic industry bipolar square wave current pulse, as shown in FIG. 7, with the duration of the current pulse on-time, $T_1$ in FIG. 7, (and hence $T_2$) set at three values, 0.05, 5.0, and 50.0 seconds. Other source current waveforms may also be used for the grounded source current, including sinusoidal waveform combinations and pseudo-random sequences as well known to one skilled in the art, provided the grounded electrode source frequency range is as stated. Sufficient repetitions (typically 50 to 1000) of the grounded electrodes' source current are made at each on-time value so that the raw stacked data time series data have three-sigma errors less than or equal to 1% over the frequency range $0.005 \leqq f \leqq 5$ Hz. This third set of receiver data is grounded radial electrode data.

The three sets of receiver data are processed in the following way. After noise suppression using standard industry methods as described above, the second set of vertical magnetic dipole data and the third set of grounded radial electrode measurements are converted to the complex frequency-wavenumber domain using standard industry 2-D Fourier and Radon transform techniques. The first set of magnetotelluric data and the second set of vertical magnetic dipole data are merged together in the frequency-wavenumber domain, for each electromagnetic tensor component of the data. The merged magnetotelluric and vertical magnetic dipole data sets are inverted, and the grounded radial electrode data set is inverted separately. Then the merged magnetotelluric and vertical magnetic dipole data and the grounded radial electrode data are inverted jointly, as discussed in D. Jupp and K. Vozoff, Geophys. Prospecting, v. 25, 460-470, 1977. The magnetotelluric data, the vertical magnetic dipole data, and the grounded radial electrode data are also inverted separately. All data inversions use the 3-D frequency-domain finite-difference fully nonlinear methods of G. A. Newman and D. L. Alumbaugh (1996, 1997, op. cit.), modified to allow for the geometries of the grounded radial electrode and the insulated loop source current arrays. Depth and parameter value constraints are enforced during the inversion, using sharp-boundary methods (G. Hoversten et al, 1998, op. cit.) and integral resistance and conductance bounds within the update region of the nonlinear inversion 3-D mesh that contains the reservoir target, combined with minimum-gradient support techniques (O. Portniaguine and M. Zhdanov, 1998, op. cit.). The nonlinear inversion update region is centered on the target reservoir, and extends 100 meters above and below the reservoir and 200 meters laterally from each reservoir edge.

The starting model for both the merged magnetotelluric and vertical magnetic dipole data inversion and the grounded radial electrode data inversion is an interpreted seismic depth model in which the mechanical properties (primarily the interval acoustic impedances) are replaced with resistivity estimates. The resistivity estimates may come from electromagnetic survey data, well logs, empirical relations to seismic parameters, or geologic basin analogs, as described above. The inversions are performed by means of a digital electronic computer of the massively parallel processor (MPP) type, or alternatively using a network of electronic digital computers that mimic an MPP computer. After the separate magnetotelluric, vertical magnetic dipole, and grounded radial electrode data inversions are completed, the magnetotelluric—vertical magnetic dipole and grounded radial electrode data are inverted jointly. The five respective 3-D depth cubes of inverted resistivity (magnetotelluric, vertical magnetic dipole, grounded radial electrode, merged magnetotelluric—vertical magnetic dipole, and merged magnetotelluric—vertical magnetic dipole—grounded radial electrode) are compared, and the ratios of their resistivity values are formed at each depth location using 3D visualization method. Finally, values of $\rho_{ss}$, $\rho_{sh}$, and ntg are derived for the reservoir interval using the methods described above, and are mapped. These mapped values are interpreted in conjunction with the 3-D seismic data and its attributes.

Figure 8:
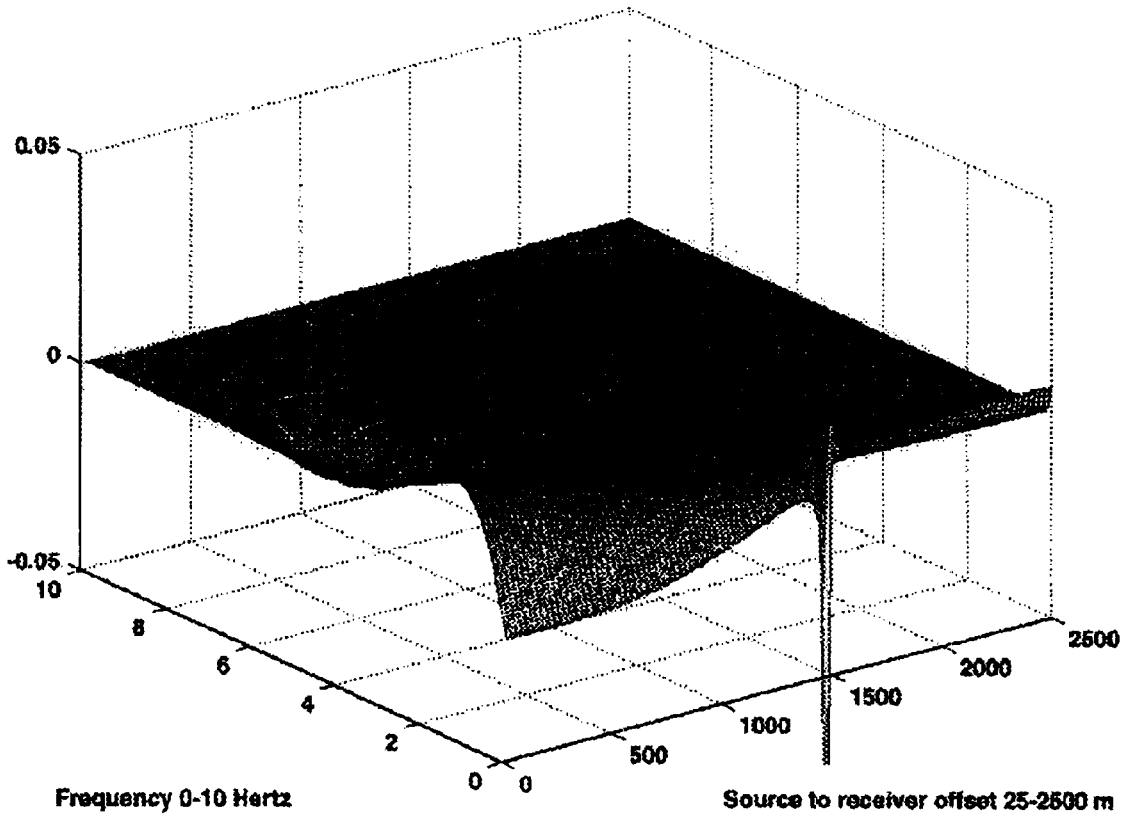
FIG. 8 is a plot of the real part of the calculated radial component $E_r$ of the surface electric field response from the example.

FIG. 8 shows the complex magnitude of the calculated radial component $E_r=(E_x^2+E_y^2)^{1/2}$ of the surface electric field response from the example traget reservoir described above, due to excitation by the grounded electrode array. The example reservoir is assumed to have a vertical thickness of 20 meters and a vertically averaged resistivity of 100 Ohm-m. The electromagnetic response was calculated using the SYSEM 3-D integral equation computer code developed at the University of Utah's Consortium for Electromagnetic Modeling and Inversion. This electric field component response is normalized to the uniform earth (halfspace) response, and is shown on FIG. 8 as a function of radial distance from the center of the array and of the source frequency, along the x=0 (or y=0) axis. Most of the normalized $E_r$ response is contained within $r \leqq 1300$ meters, and has a maximum value of approximately 33% at r=0 at the lowest survey frequency (f=0.005 Hz). The large normalized $E_r$ value at r=1500 meters is a local effect of the inner radial electrode.

The benefits provided by this invention include at least the following two. The first benefit is cost and cycle-time reduction in hydrocarbon exploration, development, and production activities, including reducing exploration drill-well risk, improving discovered-undeveloped reservoir delineation and assessment, and improving reservoir monitoring and depletion. The second benefit is improved business capture of new exploration ventures and field commercializations by offering unique, proprietary reservoir properties estimation technology.

It should be understood that the invention is not to be unduly limited to the foregoing which has been set forth for illustrative purposes. Various modifications and alternatives will be apparent to those skilled in the art without departing from the true scope of the invention, as defined in the following claims.

I claim:

1. A method for surface estimation of a resistivity depth image of a subsurface geologic formation, comprising the steps of:

determining the location of and at least one average earth resistivity for the vicinity of the subsurface geologic formation using geological and geophysical data from the vicinity of the subsurface geologic formation;

determining dimensions and probing frequency for an electromagnetic source to substantially maximize transmitted vertical and horizontal electric currents at the subsurface geologic formation using the location and the at least one average earth resistivity;

activating the electromagnetic source at or near the surface of the earth, approximately centered above the subsurface geologic formation;

measuring a plurality of components of electromagnetic response with a receiver array;

determining one or more geometrical and electrical parameter constraints, using the geological and geophysical data; and processing the electromagnetic response using the geometrical and electrical parameter constraints to produce the resistivity depth image.

2. The method of claim 1, further comprising the step of:

combining the resistivity depth image with the geological and geophysical data to estimate one or more properties of the subsurface geological formation.

3. The method of claim 1, wherein the step of determining dimensions and probing frequency is accomplished by numerically solving the uninsulated buried low-frequency electromagnetic antenna problem.

4. The method of claim 1, wherein the electromagnetic source comprises two continuously grounded circular electrodes positioned in concentric circles.

5. The method of claim 4, wherein each circular electrode comprises one or more electrically uninsulated conductors.

6. The method of claim 4, further comprising:

a third circular electrode positioned concentric with the two circular electrodes.

7. The method of claim 6, wherein the third circular electrode comprises one or more electrically insulated conductors.

8. The method of claim 1, wherein the electromagnetic source comprises six or more grounded linear radial electrodes of equal lengths placed along radii separated by equal angles, whose radial projections intersect at a common central point.

9. The method of claim 8, wherein the radial electrodes are continuously grounded along their entire length.

10. The method of claim 8, wherein the radial electrodes are continuously grounded only within a distance less than one half of the length of the radial electrode from each end.

11. The method of claim 1, wherein the subsurface geological formation is located onshore.

12. The method of claim 1, wherein the subsurface geologic formation is located offshore and the surface of the earth is the seafloor.

13. The method of claim 1, wherein the receiver array is positioned on a grid.

14. The method of claim 1, wherein the receiver array is positioned as a linear array.

15. The method of claim 1, wherein the receiver array is positioned as a swath array.

16. The method of claim 1, wherein the step of processing the electromagnetic response further comprises:

verifying the at least one average earth resistivity using the plurality of components of electromagnetic response measured with the receiver array.

17. The method of claim 1, wherein the step of processing the electromagnetic response further comprises:

applying 3-D wave-equation data processing to the electromagnetic response.

18. The method of claim 1, wherein the step of processing the electromagnetic response further comprises data noise suppression, source deconvolution, and model-guided inversion.

19. The method of claim 7, wherein the steps of activating the electromagnetic source and measuring the plurality of components of electromagnetic response further comprises:

measuring a first electromagnetic response without activating the electromagnetic source;

measuring a second electromagnetic response while activating only the third circular electrode; and measuring a third electromagnetic response while activating only the two continuously grounded circular electrodes.

20. The method of claim 19, wherein the step of processing the electromagnetic response further comprises:

merging the first and second electromagnetic responses to produce a fourth electromagnetic response;

inverting the fourth electromagnetic response; and inverting jointly the third and fourth electromagnetic responses.

21. The method of claim 20, wherein the step of processing the electromagnetic response further comprises at least one step chosen from:

inverting the first electromagnetic response;

inverting the second electromagnetic response; and inverting the third electromagnetic response.

22. The method of claim 1, wherein the resistivity depth image comprises at least one depth image component chosen from an inverted vertical resistivity depth image, an inverted horizontal resistivity depth image and an inverted three-dimensional resistivity depth image.

23. The method of claim 1, wherein the dimensions and probing frequency are verified using iterated 3-D modeling.

24. The method of claim 8, further comprising continuously grounded linear terminating electrodes connected substantially orthogonally at each end of the grounded radial electrodes.

25. The method of claim 24, wherein the length of the terminating electrodes is less than or equal to one tenth of the length of the radial electrodes.

26. The method of claim 1, wherein the electromagnetic source comprises a sub-optimal configuration.

27. The method of claim 11, wherein the plurality of components of electromagnetic response comprise:

two orthogonal horizontal electric fields;

two orthogonal horizontal magnetic fields; and a vertical magnetic field.

28. The method of claim 27, wherein the plurality of components of electromagnetic response further comprises a vertical electric field.

29. The method of claim 12, wherein the plurality of components of electromagnetic response comprise:

two orthogonal horizontal electric fields;

two orthogonal horizontal magnetic fields;

and a vertical electric field.

30. The method of claim 29, wherein the plurality of components of electromagnetic response further comprise a vertical magnetic field.

31. A method for surface estimation of an inverted resistivity depth image of a subsurface geologic formation, comprising the steps of:

determining the location of and average earth resistivity above, below, and horizontally adjacent to the subsurface geologic formation using geological and geophysical data from the vicinity of the subsurface geologic formation;

determining dimensions and probing frequency for an electromagnetic source to substantially maximize transmitted vertical and horizontal electric currents at the subsurface geologic formation using the location and the at least one average earth resistivity, said source comprising six or more grounded linear radial electrodes of equal lengths placed along radii separated by equal angles whose radial projections intersect at a common central point, continuously grounded linear terminating electrodes connected substantially orthogonally at each end of the grounded radial electrodes;

activating the electromagnetic source at or near the surface of the earth, approximately centered above the subsurface geologic formation;

measuring a plurality of components of electromagnetic response with a receiver array;

determining one or more geometrical and electrical parameter constraints, using the geological and geophysical data; and processing the electromagnetic response using the geometrical and electrical parameter constraints to produce the inverted resistivity depth image.

32. A method for surface estimation of one or more properties of a subsurface geologic formation, comprising the steps of:

determining the location of and at least one average earth resistivity for the vicinity of the subsurface geologic formation using geological and geophysical data from the vicinity of the subsurface geologic formation;

determining dimensions and probing frequency for an electromagnetic source to substantially maximize transmitted vertical and horizontal electric currents at the subsurface geologic formation using the location and the at least one average earth resistivity, said source comprising six or more grounded linear radial electrodes of equal lengths placed along radii separated by equal angles whose radial projections intersect at a common central point;

activating the electromagnetic source at or near the surface of the earth, approximately centered above the subsurface geologic formation;

measuring a plurality of components of electromagnetic response with a receiver array;

determining one or more geometrical and electrical parameter constraints, using the geological and geophysical data;

processing the electromagnetic response using the geometrical and electrical parameter constrains to produce one or more inverted resistivity depth images of the subsurface geologic formation; and combining the inverted resistivity depth images with the geological and geophysical data to estimate the properties.

33. A method for surface estimation of one or more properties of a subsurface geologic formation, comprising the steps of:

determining the location of and at least one average earth resistivity for the vicinity of the subsurface geologic formation;

determining dimensions and probing frequency for an electromagnetic source to substantially maximize transmitted vertical electric currents at the subsurface geologic formation using the location and the at least one average earth resistivity;

activating the electromagnetic source at or near the surface of the earth, approximately centered above the subsurface geologic formation;

measuring at least a vertical electromagnetic response with a receiver array;

determining one or more geometrical and electrical parameter constraints, using geological and geophysical data from the vicinity of the subsurface geologic formation;

processing the electromagnetic response using the geometrical and electrical parameter constraints to estimate the one or more properties.

*34. A method for surface estimation of a resistivity depth image of a subsurface geologic formation, said method comprising the steps of:*

*obtaining electromagnetic data, said data consisting of measurements previously made with a receiver array of a plurality of electromagnetic field components produced by a focused electromagnetic source located at or near the surface of the earth and approximately*

*centered above the geologic formation, said focused electromagnetic source having been designed by determining the location of and at least one average earth resistivity for the vicinity of the subsurface geologic formation using geological and geophysical data from the vicinity of the subsurface geologic formation, and then determining dimensions and probing frequency for the electromagnetic source to substantially maximize transmitted vertical and horizontal electric currents at the subsurface geologic formation using the location of and the at least one average earth resistivity;*

*determining one or more geometrical and electrical parameter constraints, using geological and geophysical data from the vicinity of the subsurface geologic formation; and*

*processing the electromagnetic field measurements using the geometrical and electrical parameter constraints to produce the resistivity depth image.*

*35. The method of claim 34, wherein the subsurface geologic formation is located offshore, and the surface of the earth is the seafloor.*

*36. The method of claim 35, wherein the plurality of measured electromagnetic field components comprised two orthogonal horizontal electric fields, two orthogonal horizontal magnetic fields, and a vertical electric field.*

*37. The method of claim 36, wherein the plurality of measured electromagnetic field components further comprised a vertical magnetic field.*

*38. The method of claim 34, wherein the receiver array was positioned on a grid.*

*39. The method of claim 34, wherein the receiver array was positioned as a linear array.*

*40. The method of claim 34, wherein the receiver array was positioned as a swath array.*

*41. The method of claim 34, wherein the step of processing the electromagnetic field measurements further comprises verifying the at least one average earth resistivity using the plurality of electromagnetic field components measured with the receiver array.*

*42. The method of claim 34, wherein the step of processing the electromagnetic field measurements further comprises applying 3-D wave-equation data processing to the electromagnetic field measurements.*

*43. The method of claim 34, wherein the step of processing the electromagnetic field measurements further comprises data noise suppression, source deconvolution, and model-guided inversion.*

*44. The method of claim 34, wherein the resistivity depth image comprises at least one depth image component chosen from an inverted vertical resistivity depth image, an inverted horizontal resistivity depth image, and an inverted three-dimensional resistivity depth image.*

*45. The method of claim 34, wherein the subsurface geologic formation is located onshore, and the plurality of measured electromagnetic field components comprised two orthogonal horizontal electric fields, two orthogonal horizontal magnetic fields, and a vertical magnetic field.*

*46. The method of claim 45, wherein the plurality of measured electromagnetic field components further comprised a vertical electric field.*

*47. The method of claim 34, wherein the electromagnetic source comprised two continuously grounded circular electrodes positioned in concentric circles and a third concentric circular electrode, sadi third electrode having comprised one or more electrically insulated conductors and wherein the electromagnetic field component measurements comprised*

*measuring a first electromagnetic response without activating the electromagnetic source;*

*measuring a second electromagnetic response while activating only the third circular electrode; and*

*measuring a third electromagnetic response while activating only the two continuously grounded circular electrodes;*

*and wherein the processing step further comprises:*

*merging the first and second electromagnetic responses to produce a fourth electromagnetic response;*

*inverting the fourth electromagnetic response; and*

*inverting jointly the third and fourth electromagnetic responses.*

*48. The method of claim 47, wherein the step of processing the electromagnetic response further comprises at least one step chosen from:*

*inverting the first electromagnetic response;*

*inverting the second electromagnetic response; and*

*inverting the third electromagnetic response.*

*49. A method for surface estimation of a resistivity depth image of a subsurface geological formation, comprising the steps of:*

*obtaining an electromagnetic source whose dimensions and probing frequency were determined to substantially maximize transmitted vertical and horizontal electric currents at the subsurface formation using a location of and at least one average earth resistivity for the vicinity of the formation, said location and average resistivity having been determined from geological and geophysical data from the vicinity of the formation;*

*activating the electromagnetic source at or near the surface of the earth, approximately centered above the subsurface geologic formation;*

*measuring a plurality of components of electromagnetic response with a receiver array; and*

*sending the electromagnetic response data to be processed, using one or more geometrical and electrical parameter constraints determined from the geological and geophysical data, to produce the resistivity depth image.*

*50. The method of claim 49, wherein the dimension and probing frequency determination comprised a sub-optimal configuration.*

*51. The method of claim 49, wherein the electromagnetic source comprised two continuously grounded circular electrodes positioned in concentric circles.*

*52. The method of claim 51, wherein each circular electrode comprised one or more electrically uninsulated conductors.*

*53. The method of claim 51, wherein the electromagnetic source further comprised a third electrode positioned concentric with the two circular electrodes.*

*54. The method of claim 53, wherein the third circular electrode comprised one or more electrically insulated conductors.*

*55. The method of claim 54, further comprising the steps of:*

*measuring a first electromagnetic response without activating the electromagnetic source;*

*measuring a second electromagnetic response while activating only the third circular electrode; and*

*measuring a third electromagnetic response while activating only the two continuously grounded circular electrodes.*

*56. The method of claim 49, wherein the electromagnetic source comprised six or more grounded linear radial electrodes of equal length placed along radii separated by equal angles, whose radial projections intersect at a common central point.*

*57. The method of claim 56, wherein the radial electrodes were continuously grounded along their entire length.*

*58. The method of claim 56, wherein the radial electrodes were continuously grounded only within a distance less than one-half of the length of the radial electrode from each end.*

*59. The method of claim 56, wherein the electromagnetic source further comprised continuously grounded linear terminating electrodes connected substantially orthogonally at each end of the grounded radial electrodes.*

*60. The method of claim 59, wherein the length of the terminating electrodes was less than or equal to one-tenth of the length of the radial electrodes.*

*61. The method of claim 49, wherein the receiver array is positioned on a grid.*

*62. The method of claim 49, wherein the receiver array is positioned as a linear array.*

*63. The method of claim 49, wherein the receiver array is positioned as a swath array.*

*64. The method of claim 49, wherein the subsurface geologic formation is located onshore, and the plurality of components of electromagnetic response comprise:*

*two orthogonal horizontal electric fields;*

*two orthogonal horizontal magnetic fields; and*

*a vertical magnetic field.*

*65. The method of claim 64, wherein the plurality of components of electromagnetic response further comprise a vertical electric field.*

*66. The method of claim 49, wherein the subsurface geologic formation is located offshore and the surface of the earth is the seafloor, and wherein the plurality of components of electromagnetic response comprise:*

*two orthogonal horizontal electric fields;*

*two orthogonal horizontal magnetic fields; and*

*a vertical electric field.*

*67. The method of claim 66, wherein the plurality of components of electromagnetic response further comprise a vertical magnetic field.*

* * * * *